United States Patent [19]
Nelson et al.

[11] Patent Number: 5,979,038
[45] Date of Patent: Nov. 9, 1999

[54] HIGH-ACCURACY PROCESSING MACHINE

[75] Inventors: Thomas J. Nelson; Dennis Beierman, both of Belton, Tex.

[73] Assignee: Premark RWP Holdings, Inc., Wilmington, Del.

[21] Appl. No.: 08/932,182

[22] Filed: Sep. 17, 1997

[51] Int. Cl.⁶ .................................................. B23C 1/00
[52] U.S. Cl. ............................. 29/563; 29/33 P; 83/422; 144/250.14; 409/158; 409/173
[58] Field of Search .................... 409/145, 158, 409/159, 173; 29/563, 38.9, 564, 33 P, 33 Q; 83/422; 408/70; 198/345.1; 144/250.13, 250.14, 250.16

[56] References Cited

U.S. PATENT DOCUMENTS

| | | | |
|---|---|---|---|
| 3,768,101 | 10/1973 | Kuts | 83/408 |
| 4,151,772 | 5/1979 | Johnson | 83/422 |
| 4,363,252 | 12/1982 | Volk | 83/422 |
| 4,607,558 | 8/1986 | Giroux | 83/422 |
| 4,628,585 | 12/1986 | Sillner | 29/564.6 |
| 4,691,684 | 9/1987 | Negron-Crespo | 29/563 |
| 4,796,341 | 1/1989 | Kuhn, II | 29/33 P |
| 4,823,851 | 4/1989 | Seffens | 83/422 |
| 4,878,524 | 11/1989 | Rosenthal et al. | 29/33 P |
| 5,125,140 | 6/1992 | Sticht | 29/33 P |
| 5,259,495 | 11/1993 | Douglas | 198/404 |
| 5,430,360 | 7/1995 | Rosenthal et al. | 29/33 P |
| 5,468,101 | 11/1995 | Shoda | 409/202 |

*Primary Examiner*—Daniel W. Howell
*Attorney, Agent, or Firm*—Aquilino, Welsh & Flaxman

[57] ABSTRACT

A machine for processing a workpiece is provided wherein the machine has a movable continuous belt rotatably mounted around a slider bed mounted on a frame, wherein the movable belt feeds the workpiece into and through the machine and allows for the processing of the workpiece at high precision and high accuracy, particularly when the processing involves making various cutting operations in the preparation of high pressure decorative laminate surfaced moldings.

16 Claims, 35 Drawing Sheets

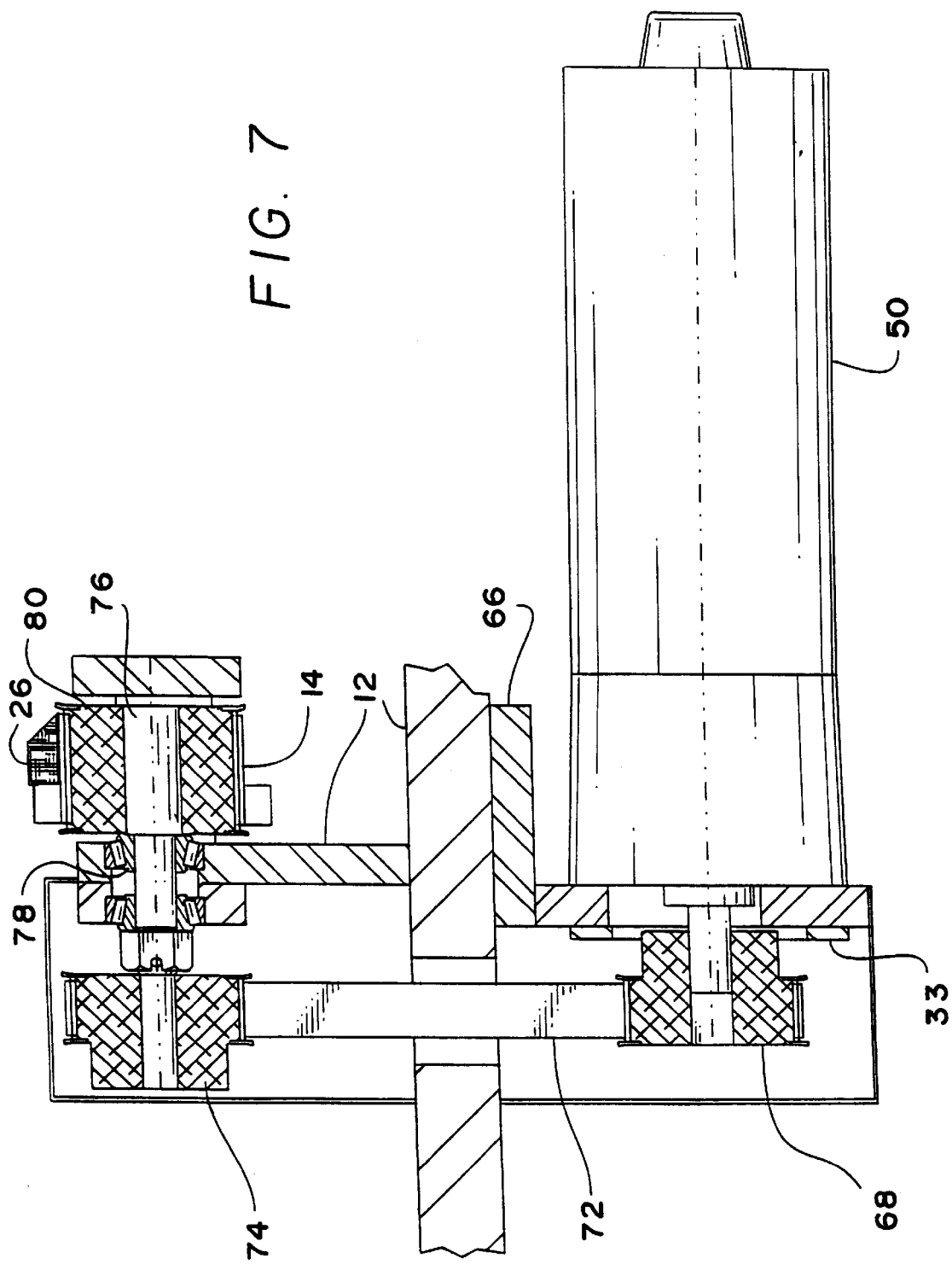

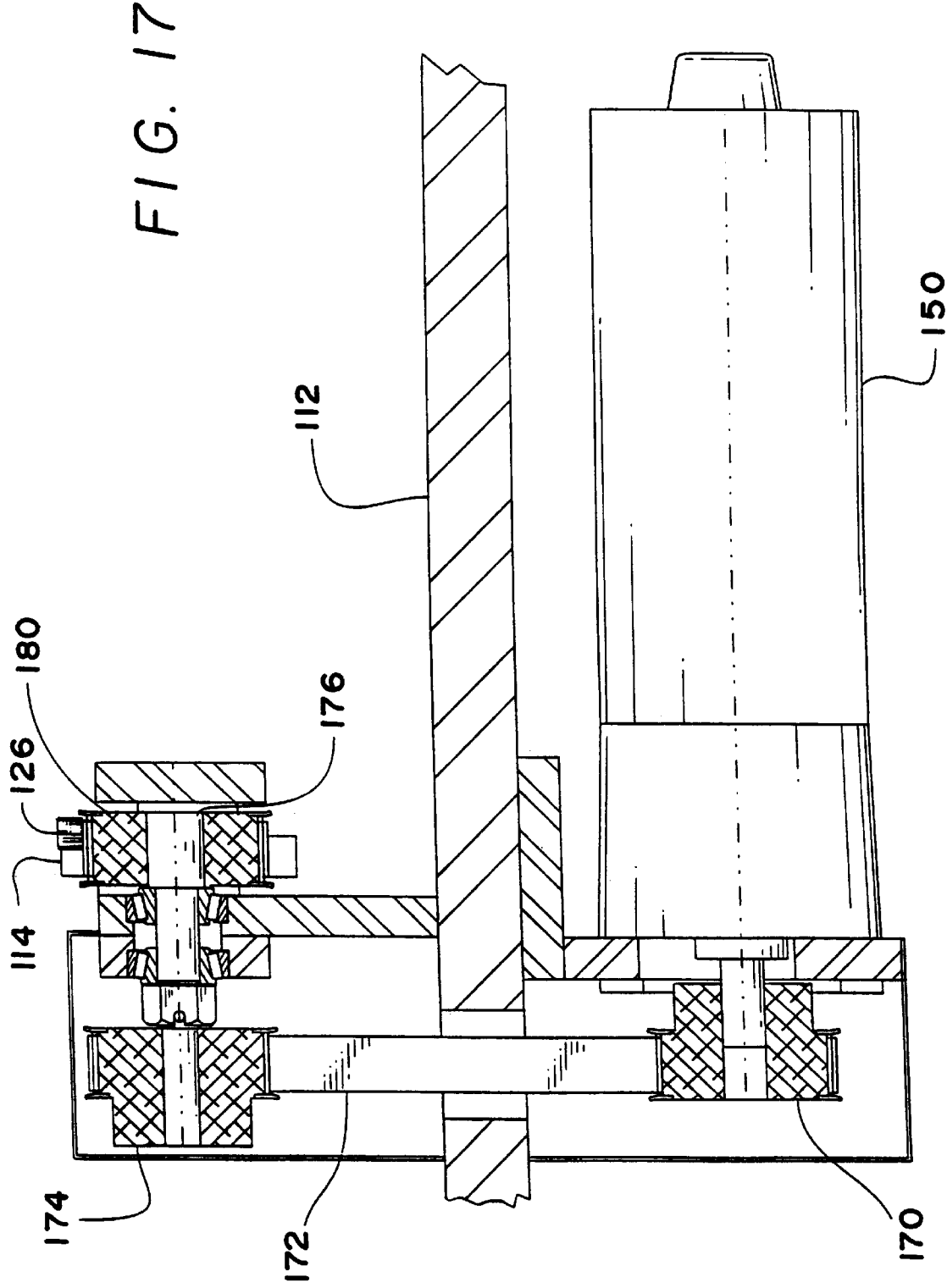

HIGH-ACCURACY PROCESSING MACHINE

BACKGROUND OF THE INVENTION

1. Field of the Invention

The present invention relates to a machine for processing a workpiece, while not marring surfaces of the workpiece. The invention more particularly concerns a machine for producing an element of a decorative product having a specific edge shape.

2. Discussion of the Background

Previously existing machines which produce decorative designs on a piece of material, such as wood, to create a molding have a number of shortcomings which result in marred or unappealing surface variations of the decorative product. Ideally, a machine that imparts a functional or decorative design onto a piece of wood in the creation of molding, should provide the lowest possible amount of undesirable surface variations or marring on any surface of the molding including the decorative surface. Some, but not all, marred surfaces can be re-worked, such as by sanding, to lessen the effect of the marring.

Prior art machines that produce molding accept a piece of wood or other workpiece onto a stationary bedplate. The workpiece is secured to the stationary bedplate by driving rollers. The driving rollers press the workpiece against the stationary bedplate. The driving rollers then rotate thus causing the workpiece to translate or move into the machine. While the workpiece moves, its lower surface rubs against the stationary bedplate. As the workpiece is introduced into the machine at least one surface of the workpiece is shaped by a cutter so as to produce an assembly profile. As the workpiece proceeds through the machine, its leading end comes into contact with one or more additional drive rollers. The force applied by the rollers must be sufficient to propel the workpiece through the machine by rotary action of the drive rollers, and usually results in the propelled surface being marred by the drive rollers. Further, unless the drive rollers are perfectly synchronized with one another, one of the rollers will push or pull the workpiece relative to the other roller, thus causing one of the rollers to move relative to the workpiece. The relative motion results in uneven machining and marring, or even destruction, of the workpiece. Still further, the movement of the workpiece relative to the stationary bedplate causes a stick/slip situation in which the molding moves in a discontinuous fashion still further causing the drive rollers to move relative to the workpiece thus causing surface damage to the molding. These cutting machines of the prior art also damage another surface of the molding in that the decorative surface of the molding that is in contact with the stationary bedplate is subject to marring and scratching due to the surface sliding across the stationary bedplate.

The lengths of molding which can be accepted in the machine and secured must have a minimum length which is equal to the distance between adjacent drive rollers. Otherwise, a workpiece shorter than the minimum length will not be fed through the machine. Such a limitation restricts the use of relatively short length moldings and produces relatively large amounts of scrap material. The scrap material often arises as the workpiece enters the cutting area from the leading edge of the workpiece from the time it first contacts the cutter until the time that it first contacts the closest drive roller to the exit side of the cutting area, causing the scrap material at the leading end of the workpiece for a distance equal to the distance from the cutter to the first drive roller at the exit of the cutting area. Scrap material is also produced once the trailing edge of the workpiece leaves contact with the drive roller closest to the cutter on the inlet side, up to a point where the cutter cuts the workpiece. Thus, there is a need for a machine which produces molding that does not mar the surfaces of the molding product or waste such large portions of the workpiece's length.

SUMMARY OF THE INVENTION

Accordingly, one object of the present invention is to provide a machine that produces molding and does not mar the decorative surfaces of the molding.

A further object of present invention is to provide a machine that provides accurate and precise cuts in a workpiece while maintaining the integrity of the decorative surfaces of the workpiece not being cut.

These and other objects of the present invention have been satisfied by the discovery of a machine for cutting a workpiece, which comprises:

a frame;

a slider bed mounted on said frame;

a movable continuous belt rotatably mounted around said slider bed, wherein the workpiece has a first surface that is in contact with an outer surface of said movable continuous belt during machine operation and wherein said outer surface of said movable continuous belt has sufficient friction, relative to said workpiece, to move the workpiece through the machine without slippage between the workpiece first surface and said outer surface, but does not mar or scratch the workpiece first surface;

a plurality of track rollers slidably mounted on said frame, said track rollers movable relative to said frame so as to maintain contact between the workpiece first surface and said outer surface of said movable continuous belt;

at least one element attached to said frame and to said plurality of track rollers for urging said plurality of track rollers towards the workpiece; and at least one processing means mounted on said frame between adjacent track rollers, wherein said at least one processing means performs a processing operation on a second surface of the workpiece during machine operation;

and its use alone or in combination with one or more conventional processing machines or one or more machines of the present invention in the production of moldings of various shapes and contours, prepared from a variety of workpiece materials, with high accuracy and precision and without marring or scratching non-processed surfaces of the workpiece, particularly decorative surfaces.

Another form of the invention includes a method of processing a workpiece on a machine, which comprises the steps of:

introducing the workpiece onto a support of the machine;

applying a force such that the workpiece moves with the support;

moving the support so as to transfer the workpiece to at least one processing device; and processing the workpiece by the at least one processing device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a partial cross-sectional view along line 7—7 of FIG. 1, showing the face molding machine near the vicinity of the motor;

FIG. 17 is a partial cross-sectional view taken along line 17—17 of FIG. 13, displaying the bevel molding machine in the vicinity of the drive motor;

DESCRIPTION OF THE PREFERRED EMBODIMENTS

Figure 1:
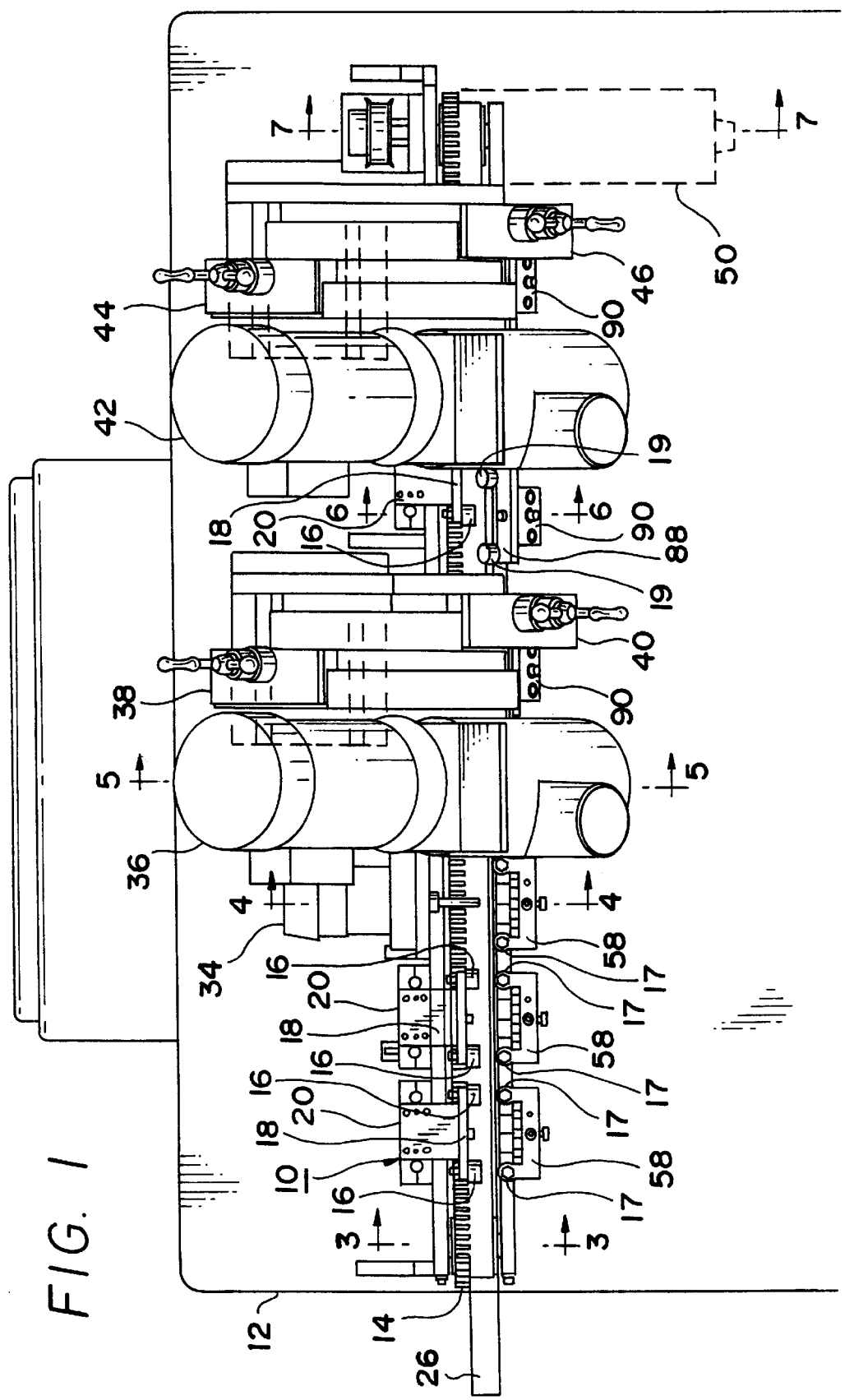
FIG. 1 is a plan view of a face molding machine.

The present invention relates to a machine for processing a workpiece with high precision and accuracy, preferably for cutting the workpiece on one or more sides of the workpiece. The machine comprises a frame, a slider bed mounted on said frame, a movable continuous belt rotatably mounted around said slider bed, wherein the workpiece has a first surface that is in contact with an outer surface of said movable continuous belt during machine operation and wherein said outer surface of said movable continuous belt has sufficient friction, relative to said workpiece, to move the workpiece through the machine without slippage between the workpiece first surface and said outer surface, but does not mar or scratch the workpiece first surface, a plurality of track rollers slidably mounted on said frame, said track rollers movable relative to said frame so as to maintain contact between the workpiece first surface and said outer surface of said movable belt; and at least one processing means mounted on said frame between adjacent track rollers, wherein said at least one processing means performs a processing operation on a second surface of the workpiece during machine operation.

In the machine of the present invention, the processing means can be any conventional means for performing a processing step on a workpiece, preferably when the processing step requires high levels of accuracy and precision. The processing means preferably includes, but is not limited to, cutting means, sanding means, polishing means and marking means. The cutting means of the present invention is a most preferred embodiment and includes, but is not limited to, a cutting spindle, a router, a dado cutter, etc. The cutting machine of the preferred embodiment of the present invention can be used to provide a wide variety of types of cuts in a workpiece, including, but not limited to, a beveled edge, contoured edge, or any type of edge profile.

The workpiece that can be processed in the machine of the present invention can be any type of workpiece requiring precise and accurate processing. Preferably, the workpiece is a decorative molding for use in furniture or other household items, such as countertops and vanities. The workpiece can be made of any material and is preferably a fiberboard composite material of low to high density, preferably medium density fiberboard. The preferred fiberboard material is made of formaldehyde resin impregnated wood fibers. In a most preferred embodiment the machine is used for processing a high pressure decorative laminate faced molding which comprises a medium density fiberboard core with a decorative face formed by a conventional high pressure decorative laminate, such as those made from multiple layers of kraft paper impregnated with phenolic resin, and onto which a melamine impregnated decorative pattern has been formed. The laminate is attached to the medium density fiberboard core with a polyvinyl acetate type adhesive as conventionally done.

The workpiece can also be made of polymeric material throughout, can have decorative edges or surfaces other than high density decorative laminate, such as foil finishes, polished metal finishes, polymer veneers, wood veneers, or can be a solid piece of wood. The workpiece can also be a section of laminate or wood flooring. The machine of the present invention can be used to put the appropriate edges onto such flooring in order to allow the flooring to form high quality seams between sections. Particularly preferred workpieces for use in the present machines are the variety of moldings described in Nelson, U.S. Pat. Nos. 5,613,342; 5,469,685; 5,157,891; and 4,996,817, the contents of each of which are hereby incorporated by reference.

In processing conventional high pressure decorative laminate moldings, it is necessary to have high accuracy and precision in the cuts made, particularly if the cuts are made through the laminate surface. This is particularly important in processing laminates, since high pressure decorative laminate cannot be sanded to remove imperfections formed therein due to cutting errors. The machine of a preferred embodiment of the present invention allows for the highly accurate and highly precise cutting of high pressure decorative laminate moldings to give cut edges that are vastly superior to any conventional process or machine.

The machine of the present invention uses a movable belt as the bed on which the workpiece rests as it passes through the processing machine. The belt can be operated at any desired feed rate that is consistent with the processing step being performed. In the cutting machine of a preferred embodiment of the present invention, the movable belt is operated at a speed to provide a linear feed rate of the workpiece of from 30–70 ft/min, preferably 40–60 ft/min, more preferably from 45–55 ft/min. However, this feed rate for a cutting process can be increased, depending on the cutting technology used. The feed rate of the workpiece is only limited by the technology of the processing step itself.

The cutting machine of a preferred embodiment of the present invention provides further improvements over the conventional molding cutting machines in that the preferred cutting machine of the present invention has about 50% fewer moving parts that the conventional machine. Among other things, this provides higher manufacturing productivity, longer machine lifetime, lower maintenance costs and less wear on the parts.

While the machine of the present invention can be used in a variety of different processes, taking advantage of the movable belt and track roller arrangement unique to the present invention, the present invention will now be described in more detail with reference to a face molding machine and a bevel molding machine, followed by first and second stage bevel edge molding machines.

In one preferred embodiment of the invention the machine takes the form of a face molding machine having a movable belt on top of a slider bed. The workpiece is placed on the movable belt and is secured against the movable belt with track rollers which urge the workpiece against the surface of the movable belt. Substantially, no relative motion exists between the surface of the movable belt and the workpiece. The workpiece is then introduced into the machine and is cut by a router on a surface of the workpiece, if needed, depending on the height of the workpiece. The workpiece is then cut in a two step process to provide a beveled cut on the workpiece. The first cut is a hogging cut performed by a spindle. The same surface is then further processed by another spindle which performs a finishing cut to the surface of the workpiece. The initially rectangular cross-sectional shaped workpiece now has a beveled cut. The hogging cut typically takes off at least 90% of the material to be removed, preferably at least 95% of the material to be removed. The finishing cut then removes the rest of the material that must be removed to give the desired profile to the workpiece.

Referring now to the drawings, wherein like reference numerals designate identical or corresponding parts throughout the several views, and more particularly to FIG. 1 thereof, a face molding machine 10 has been created which provides for creation of a workpiece having high quality surface finishes and dimensional tolerances. The dimensional tolerances that can be provided using the machine of the present invention are less than or equal to the thickness of the laminate decorative paper itself. Such low tolerances allow for the formation of closely fitting seams between adjacent laminate sections which have been cut by the machine of the present invention.

An embodiment of this invention is displayed in FIGS. 1–7. FIG. 1 is a plan view of the face molding machine 10 which displays the general layout of the machine which includes the frame 12, the movable belt 14, the numerous track rollers 16, 17, 19, positioned about the movable belt 14, the router 34, the hogging spindle 36, the finishing spindle 42, and the drive motor 50 shown in phantom line.

Figure 2:
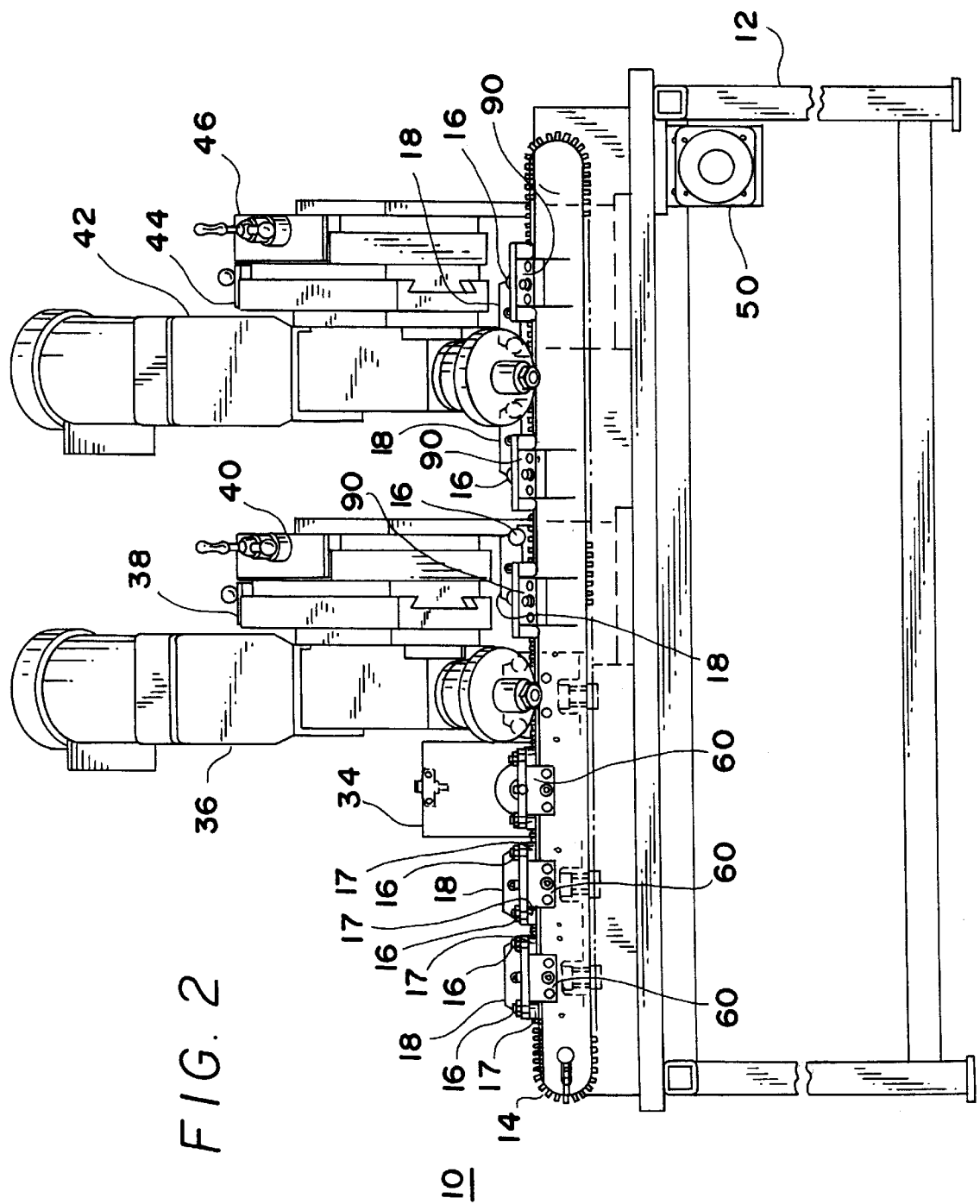
FIG. 2 is a front view of the face molding machine.

FIG. 2 is a front view of the face molding machine 10 which displays the general layout of the machine including the frame 12, the movable belt 14, the numerous track rollers 16, 17, the router 34, the hogging spindle 36, the finishing spindle 42, and the motor 50.

Figure 3:
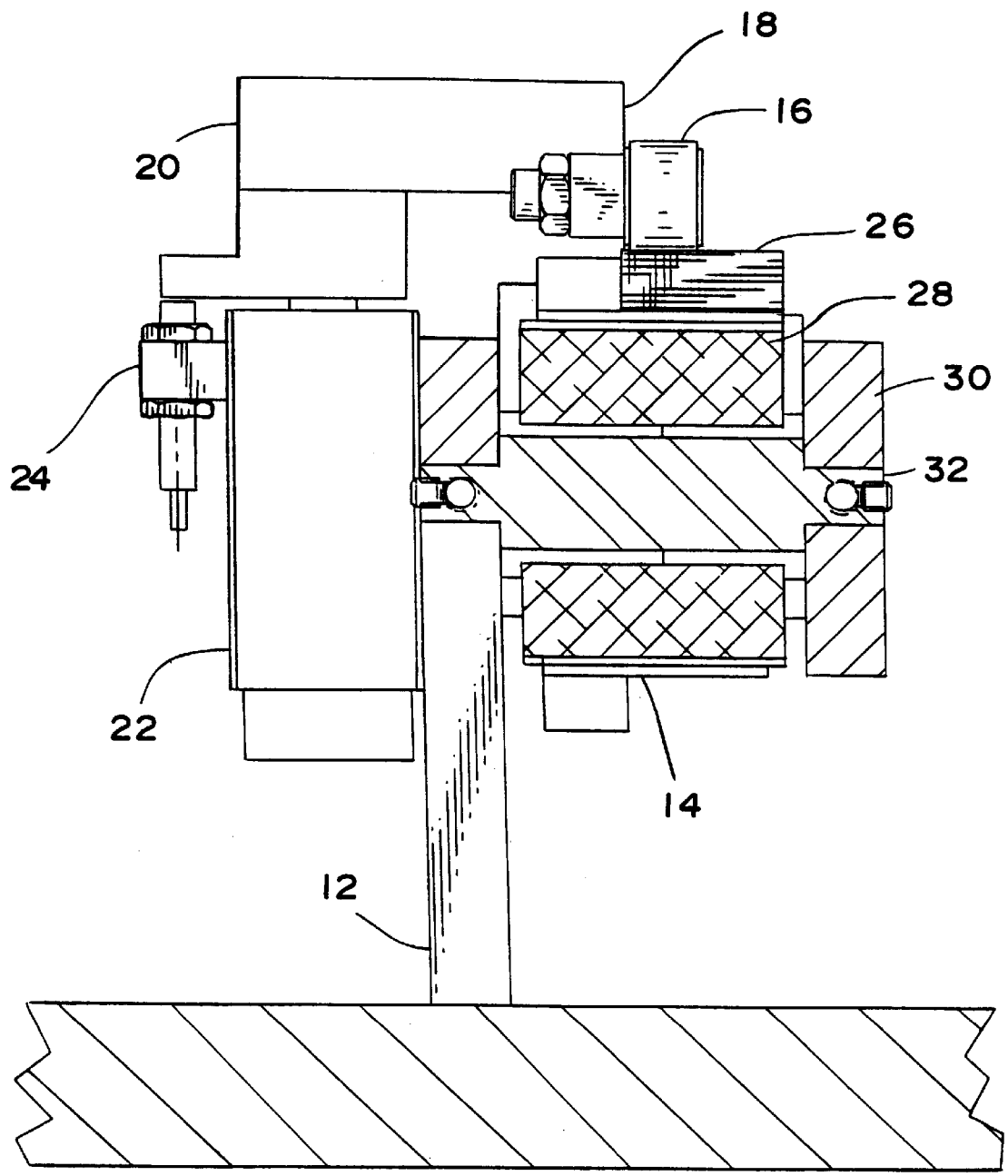
FIG. 3 is a partial cross-sectional view along line 3—3 of FIG. 1, showing some of the elements near the entrance or inlet of the face molding machine.

FIG. 3 is a partial cross-sectional view taken along section line 3—3 of FIG. 1. FIG. 3 displays how the leading idler shaft 32 fits in the frame 12, and around which the bearing 30 is positioned. The leading pulley 28 is mounted about the bearing 30. FIG. 2 further illustrates how the movable belt 14 is rotatably connected to the leading pulley 28. Atop the movable belt 14 is positioned the workpiece 26. The workpiece 26 is secured by frictional force to the movable belt 14. The friction force is generated by the downward pressure of the track roller 16 which is connected to the yoke 18. The yoke 18 is connected to the arm 20, which is connected to the track roller slide 22. The track roller slide 22 is connected to the frame 12. The track roller slide 22 is composed of two parts, a first part connected to the frame 12 and a second part which is slidably mounted in the first part and is connected to the arm 20. The track roller slide 22 is a pneumatic actuator which is provided with pneumatic power so as to enable the track roller 16 to be continuously urged against the workpiece 26. The track roller slide 22 produces a force between the workpiece and the movable belt 14 sufficient to prevent slippage between the two. This force varies depending on the workpiece and depending on the movable belt surface and is readily determined by one of ordinary skill in the art. Preferably, the force created is produced from a pressure between 7 and 70 pounds per square inch. The track roller slide 22 is manufactured by PHD and has a part number of SDD24x1/4.

Connected to the side of the track roller slide 22 is a proximity switch 24. The proximity switch 24 senses the distance of the arm 20 from the portion of the track roller slide 22 connected to the frame 12. If the distance is greater than a set value, then the workpiece 26 is considered to be too large and must be cut down to an appropriate size. When the signal from the proximity switch 24 exceeds the set value, then the router 34 is activated so as to cut the workpiece 26 down to the set value.

Figure 11:
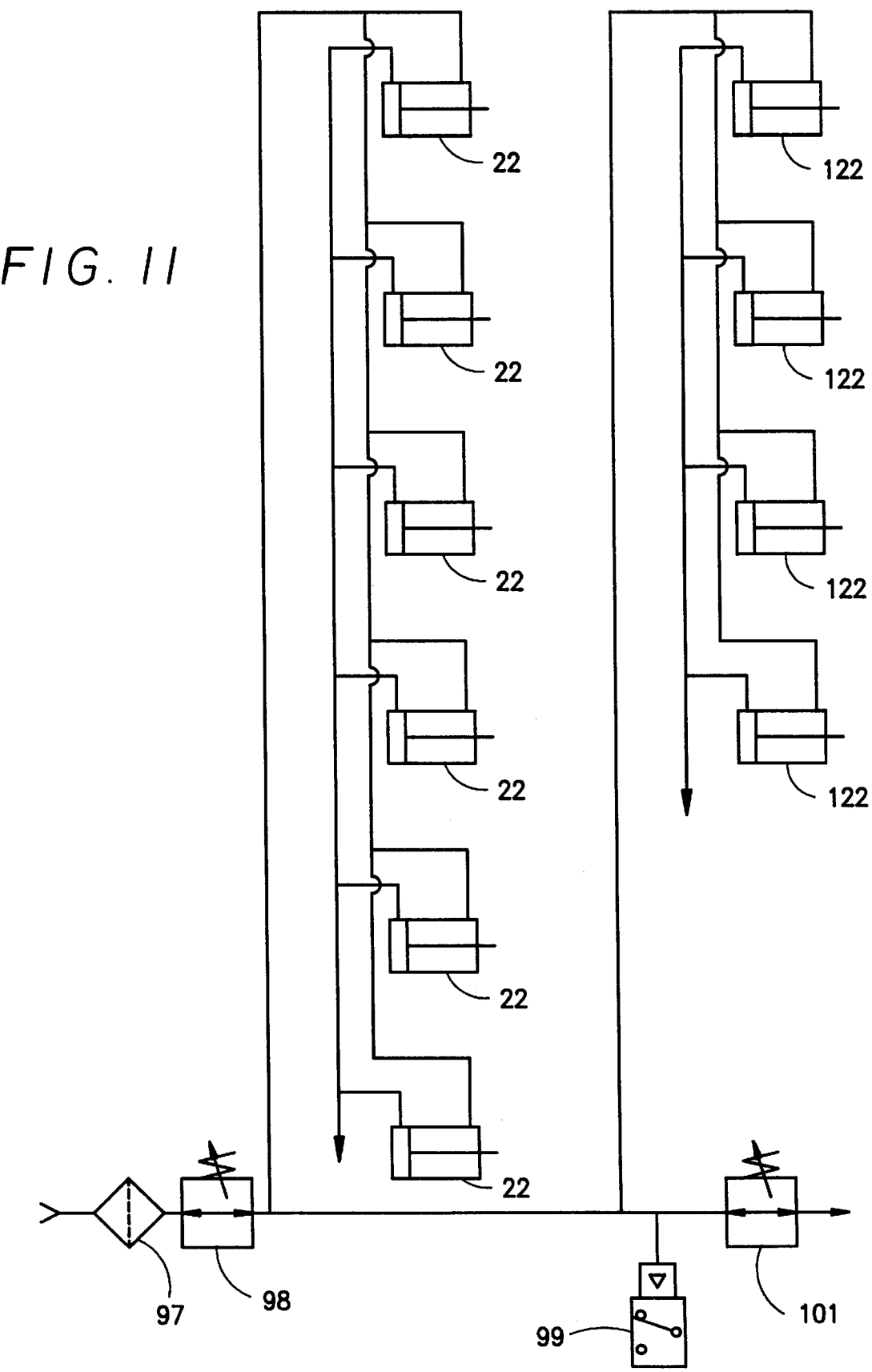
FIG. 11 is a schematic of the pneumatic system of both the face molding machine and the bevel molding machine.

FIG. 11 is a schematic of a pneumatic system of the face molding machine 10. FIG. 11 displays the distribution of pneumatic power to the track roller slides 22. The pneumatic system is powered by a compressor (not shown) that delivers the working gas (typically compressed air) at a rate and pressure sufficient to provide a hold down pressure that prevents slippage between the workpiece and the movable belt 14. The pressure and flow rate of the working gas is dependent on a variety of factors readily determined by one of ordinary skill in the art. Preferably, the compressor supplies the working gas at a pressure and flow rate sufficient to provide a hold down pressure of from 7 to 70 pounds per square inch, once again dependent on the type of workpiece and the surface of the movable belt.

Figure 4:
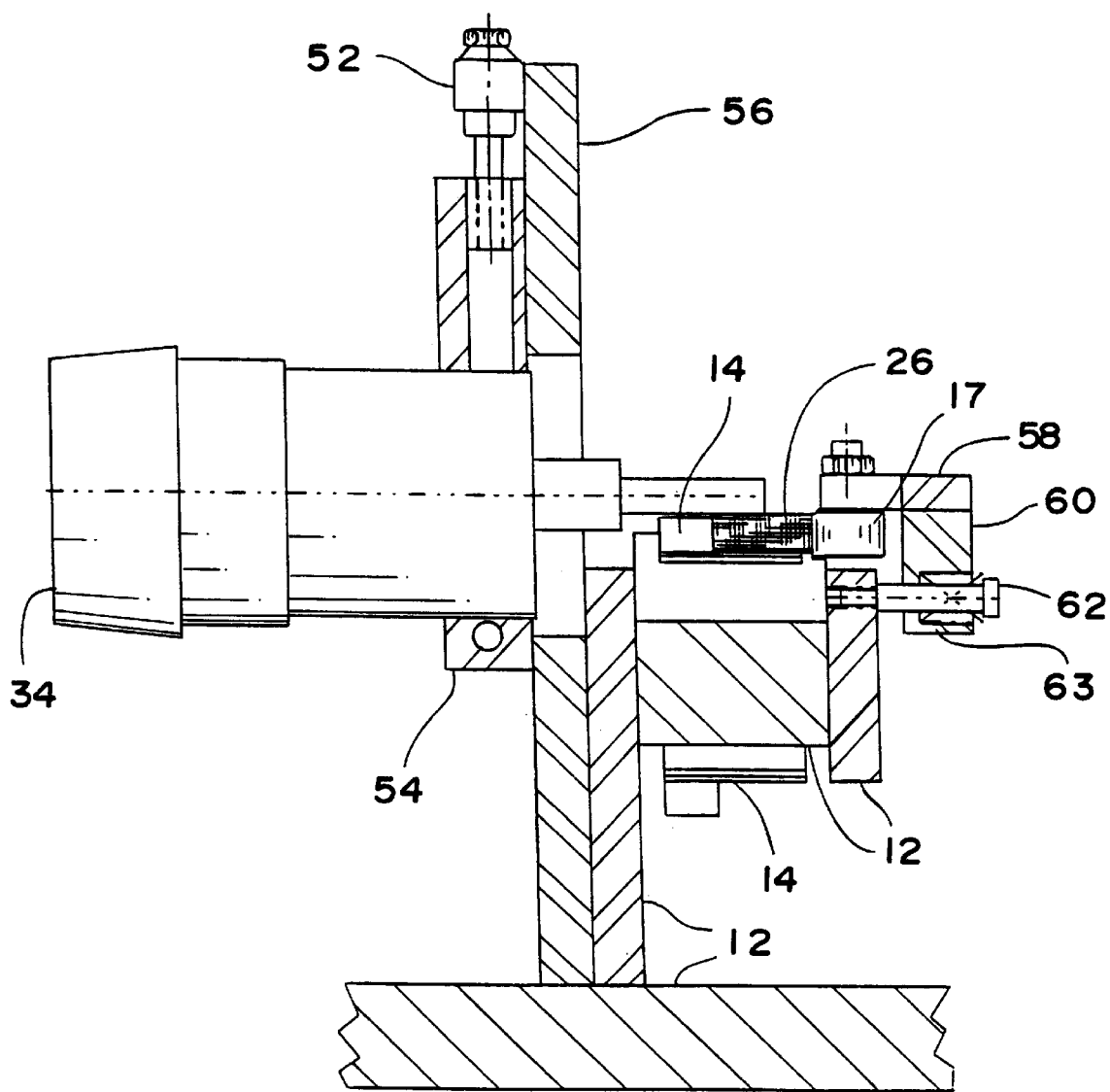
FIG. 4 is a partial cross-sectional view along line 4—4 of FIG. 1, showing the face molding machine in the vicinity of an attached router.

FIG. 4 is a partial cross-sectional view along line 4—4 of FIG. 1, showing the face molding machine 10 in the vicinity of the router 34. FIG. 4 displays the slider bed 64 mounted on the frame 12, and the movable belt 14 rotatably mounted on the slider bed 64. FIG. 4 further illustrates the workpiece 26 positioned on the movable belt 14. A track roller 17 urges the workpiece 26 against the movable belt 14. The track roller 17 is attached to a lateral yoke 58 which is further attached to a lateral guide block 60. The lateral guide block 60 is attached to the frame 12 through use of a shoulder bolt 62. The lateral spring 63 is interposed between the lateral guide block 60 and the shoulder bolt 62 so as to enable the track roller 17 to urge the workpiece 26 against the movable belt 14. In this embodiment the lateral spring 63 is manufactured by Lee and the model number is LCM-160H-4.

FIG. 4 further illustrates a router mounting 56 which is attached to the frame 12. The router 34 is attached to a router clip 54. The router clip 54 is connected to a vertical positioning device 52 which is also attached to the router mounting 56.

Figure 5:
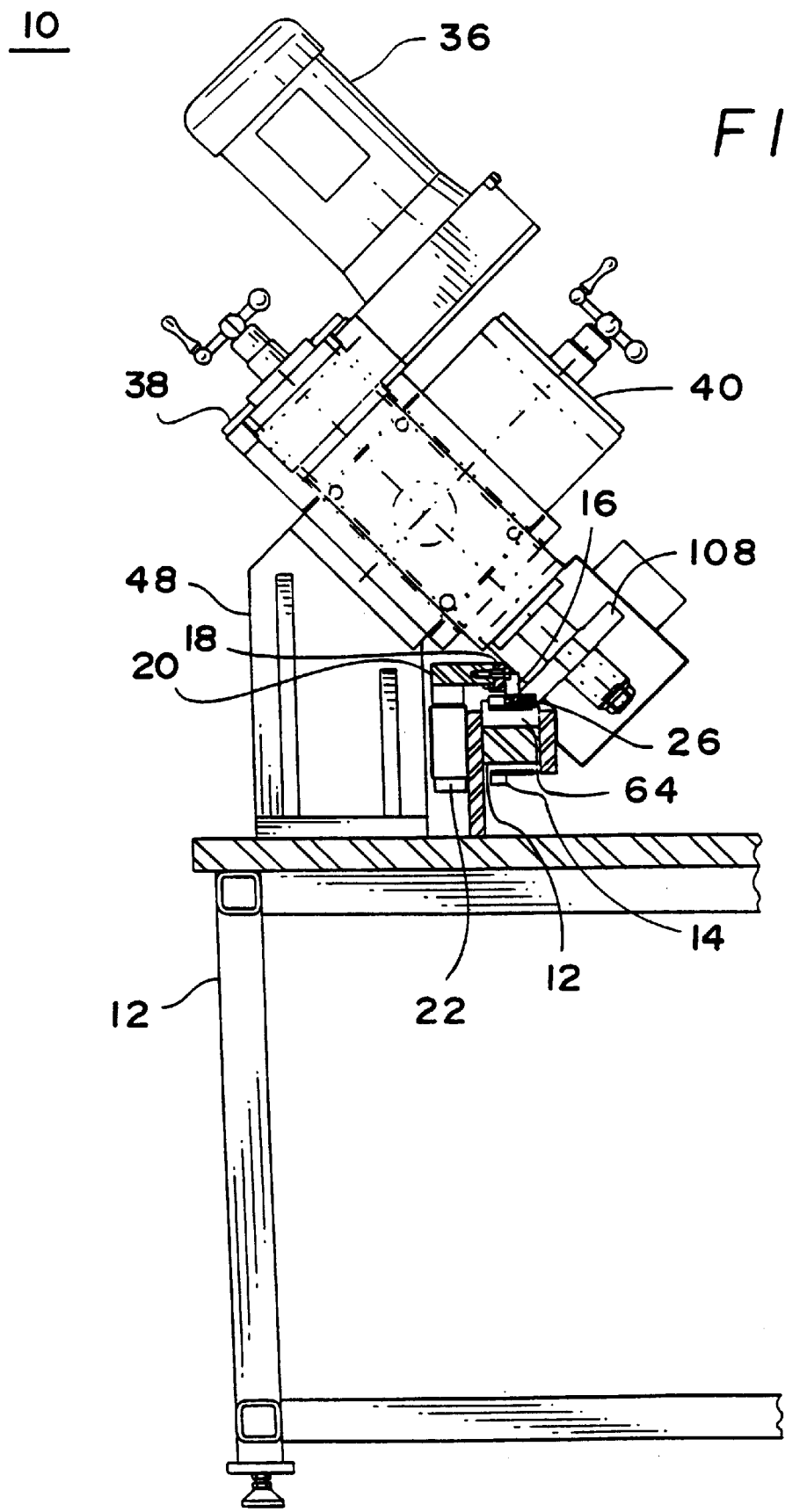
FIG. 5 is a partial cross-sectional view along line 5—5 of FIG. 1, showing the face molding machine in the vicinity of a hogging spindle.

FIG. 5 is a partial cross-section view along line 5—5 of FIG. 1, showing the machine in the vicinity of the hogging spindle 36. FIG. 5 displays a hogging spindle mounting bracket 48 connected to the frame 12. As shown in FIGS. 1, 2 and 5 a first hogging spindle slide 40 is connected to the hogging spindle mounting bracket 48. The first hogging spindle slide 40 provides linear motion along its longitudinal axis. Connected to one surface of the first hogging spindle slide 40 is a surface of the second hogging spindle slide 38. The second hogging spindle slide 38 provides for linear motion along its longitudinal axis which is perpendicular to the longitudinal axis of the first hogging spindle slide 40. Connected to a surface of the second hogging spindle slide 38 is the hogging spindle 36. As shown in FIG. 5 the hogging spindle 36 has a hogging spindle cutter 108.

Further illustrated in FIG. 5 is the position of the slider bed 64 attached to the frame 12, the movable belt 14 rotatably mounted on the slider bed 64, and the workpiece 26 positioned on the movable belt 14. The slider bed 64 supports the movable belt 14 in both the vertical and horizontal directions. Also shown is a track roller 16 urging the workpiece 26 against the movable belt 14.

FIGS. 1 and 2 show that the finishing spindle 42 is connected to the frame 12 in a similar manner as is the hogging spindle 36. However, the finishing spindle 42 has its own first finishing spindle slide 46 which is attached to the frame 12. The finishing spindle 42 further has a second finishing spindle slide 44 attached to the output surface of the first finishing spindle slide 46. The finishing spindle 42 is attached to an output surface of the second finishing spindle slide 44. Each of the finishing spindle slides have their movable linear axes oriented perpendicular to each other. The finishing spindle 42 removes material similar to that of the hogging spindle 36 and is oriented in substantially the same direction.

Figure 6:
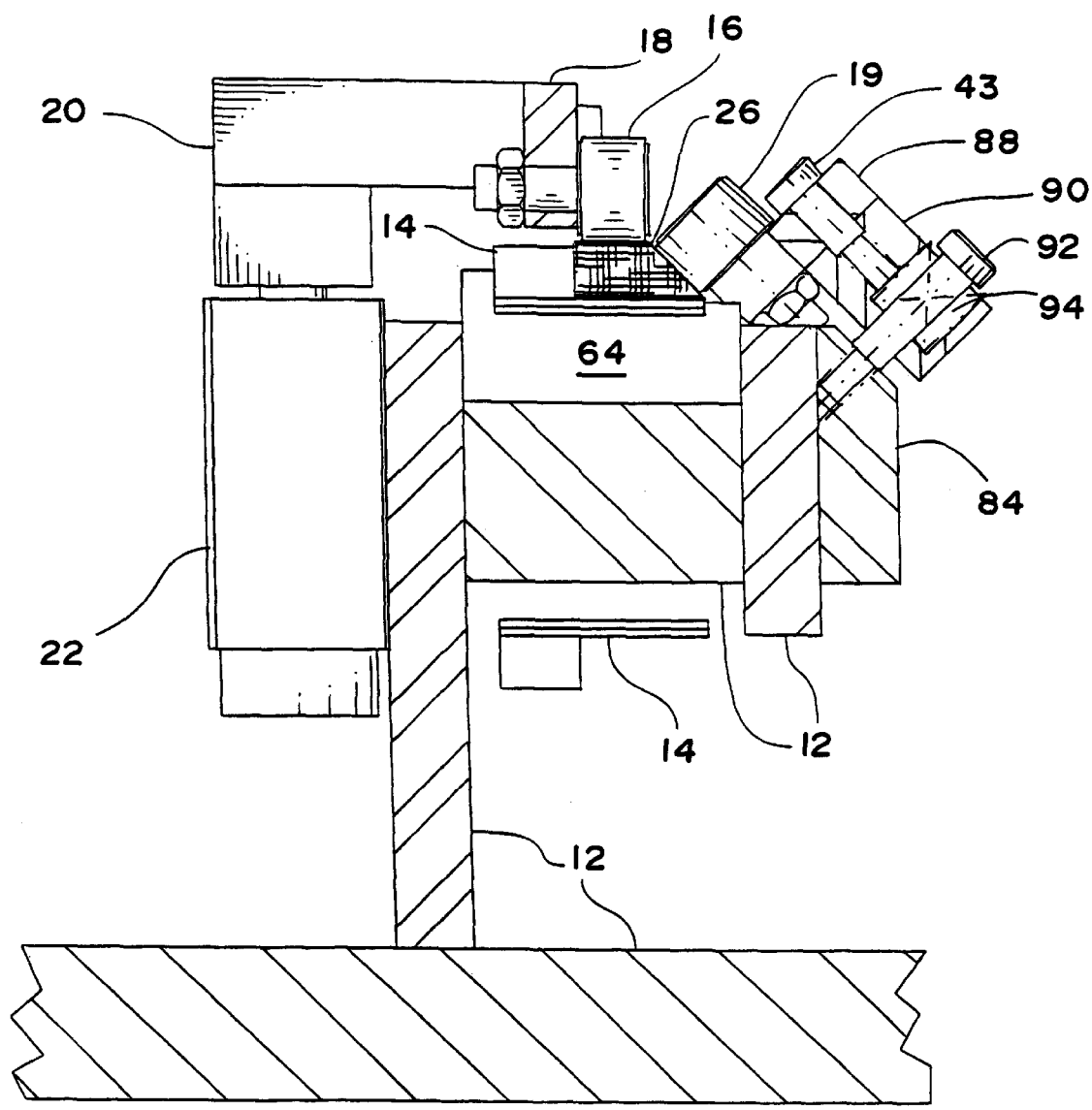
FIG. 6 is a partial cross-sectional view along line 6—6 of FIG. 1, showing the face molding machine after the workpiece has exited the hogging spindle area.

FIG. 6 is a partial cross-sectional view along line 6—6 of FIG. 1, showing the machine after the workpiece has exited the area around the hogging spindle 36. FIG. 6 displays the slider bed 64 attached to the frame 12. The movable belt 14 is mounted on the slider bed 64. The workpiece 26 is urged against the movable belt 14 by track rollers 16, 19. A track roller 16 positioned on top of the workpiece 26 urges the workpiece 26 towards the movable belt 14. Further illustrated in FIG. 6 is another track roller 19 oriented about the bevel cut surface produced by the hogging spindle 36. That particular track roller 19 is connected to a pivot plate 88. The pivot plate 88 is connected to a bevel guide block 90 through use of shoulder bolts 43. The bevel guide block 90 is connected to a bevel mounting block 84 through use of a shoulder bolt 92. Interposed between the shoulder bolt 92 and the bevel guide block 90 is a spring 94. The spring 94 allows the track roller 19 to be urged against the bevel cut surface of the workpiece 26. The bevel mounting block 84 is connected to the frame 12. The spring 94 has the same characteristics as the lateral spring 63.

FIG. 7 is a partial cross-sectional view along line 7—7 of FIG. 1, showing the face molding machine 10 near the vicinity of the motor 50. FIG. 7 displays a motor mounting bracket 66 connected to the frame 12. Connected to the motor mounting bracket 66 is a motor washing plate 33. The motor 50 is connected to the motor washing plate 33. Connected to the output of the motor 50 is a motor pulley 68. Rotatably connected to the motor pulley 68 is a power transmission belt 72. The power transmission belt 72 transmits power to a drive shaft pulley 74 which is mounted on a drive shaft 76. The drive shaft 76 is mounted in a pair of bearings 78. The bearings are mounted to plates connected to the frame 12. An end of the drive shaft 76 is connected to a trailing edge pulley 80. The movable belt 14 is rotatably connected to the trailing edge pulley 80. The movable belt 14 receives its supply of power from the trailing edge pulley 80. The motor 50 is an electric direct current motor capable of variable speed control. Each of the pulleys 68, 74, and 80 are of equal diameters so that the effective gear ratio between the output of the motor 50 and the output of the drive shaft near the movable belt 14 is 1:1. The effective gear ratio may be other than 1:1, and the power source of the system may be other than that of an electric direct current motor. The motor 50 is operated so as to produce a linear feed rate along the surface of the movable belt 14 of between 40 to 60 feet per minute, however, any feed rate can be used. The motor is manufactured by Baldor, part number GPP3330.

Figure 8A:
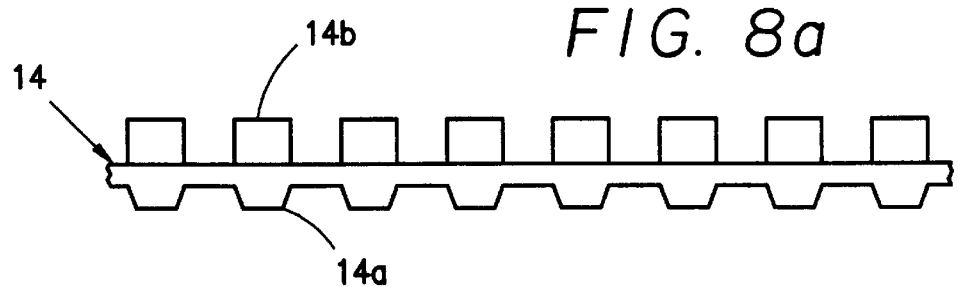
FIGS. 8a and 8b are side and cross-sectional views of the movable belt, respectively, of the face molding machine.
Figure 8B:
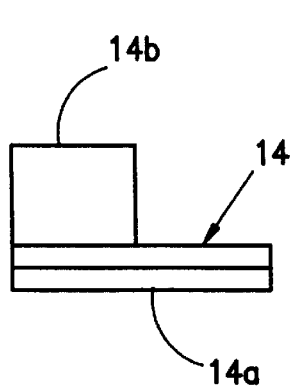

FIG. 8a is a partial side view of the movable belt 14. FIG. 8b is a cross-sectional view of the movable belt 14. The movable belt 14 has cogs 14a on its lower surface so as to positively receive power from the trailing edge pulley 80. The top surface of the movable belt 14 is provided with bearing surfaces or segments 14b of a moving fence integral to the movable belt 14 so as to abut surfaces of the workpiece 26. The movable belt 14 has a circumference of approximately one-hundred-twenty-five inches. The overall width of the movable belt 14 is approximately two inches. Each segment 14b of the moving fence of the movable belt 14 are approximately a quarter-inch thick, a half-inch tall, and three-quarters-inch wide. The segments 14b are approximately equally spaced from one another. Any shape of moving fence segments 14b can be used depending on the shape of the workpiece. The movable belt 14 is manufactured by Brecoflex and consists of braided stainless steel wire rope running lengthwise which is surrounded by a nylon polymer.

Figure 9A:
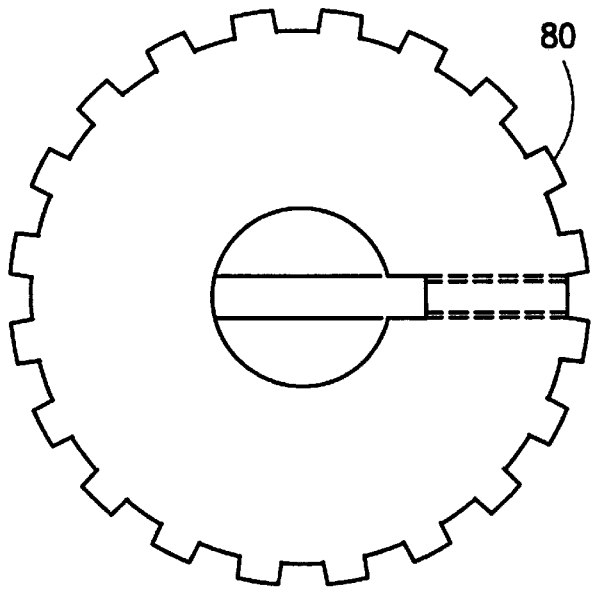
FIGS. 9a and 9b are front and top views of the trailing edge pulley, respectively, of the face molding machine.
Figure 9B:
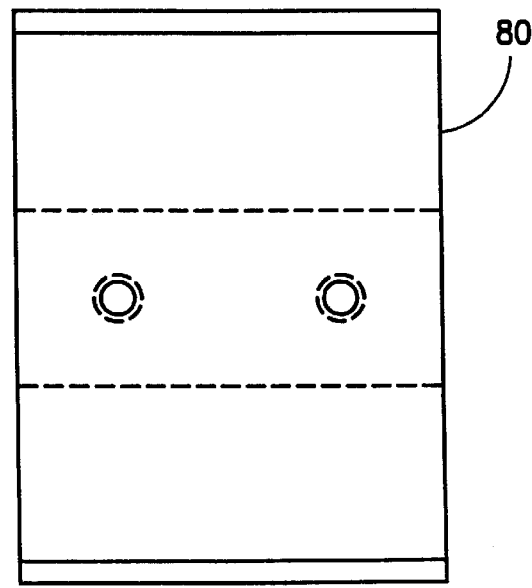

FIG. 9a is a front of the trailing edge pulley 80. FIG. 9b is a partial side view of the trailing edge pulley 80. The pulley is made of aluminum.

Figure 10:
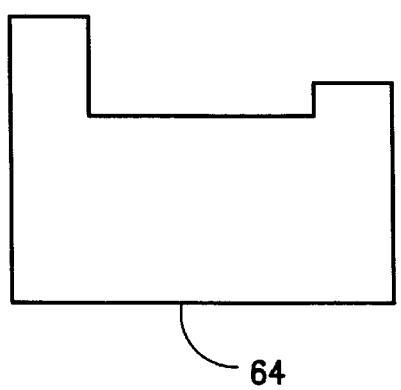
FIG. 10 is a cross-sectional view of the slider bed of the face molding machine.

FIG. 10 is a cross-sectional view of the slider bed 64. The slider bed 64 is manufactured by Brecoflex and is made of a self-lubricating polymer, such as a nylon, a polyolefin, etc, so long as the slider bed has sufficient heat resistance to withstand any frictional heat generated by the movable belt 14 passing over it. The slider bed 64 is approximately fifty-two and one-half inches long. The width along the bottom is approximately 2.676 inches. The height on the left side is approximately 1.26 inches, the width on the upper right side is approximately 0.338 inches, the height on the right side is approximately 0.979 inches and the width of the upper base portion where the movable belt 14 contacts the slider bed 64 is approximately 2.005 inches.

FIG. 11 is a schematic of the pneumatic system of both the face molding machine 10 and of another machine, the bevel molding machine 110. The pneumatic actuators displayed therein are the track roller slides 22. FIG. 11 further illustrates the pneumatic actuators 22 used to urge the track rollers 16 against the workpiece 26. Air pressure is supplied from a compressor (not shown) which is attached to the filter regulator 97. The pneumatic system is activated by a pressure switch 99. A pressure relief valve 98 is also shown attached to the pneumatic circuit. The pneumatic schematic further shows that accessories can be attached to the pneumatic line adjacent to the regulator 101.

The workpiece 26 as shown in FIG. 3 consists of medium density fiberboard material acting as a core board. Attached to an outer surface of the fiberboard material is a laminate. The laminate is attached to the fiberboard through use of a glue such as urea or polyvinyl acetate. The laminate typically consists of kraft paper treated in a phenolic resin with a melamine treated decorative paper. As shown in FIG. 3 the workpiece 26 has one surface which contacts the movable belt 14, that surface is the surface which has the decorative laminate material attached to the fiberboard material.

In operation the workpiece 26 has a substantially rectangular shape in cross-section and has one surface of the medium density fiberboard with a high pressure laminate face. The unprocessed workpiece 26 has a length of 145.5 inches, a width of 1.375 inches, and a thickness of 0.528 inches. The laminated face is a decorative face which must remain in a near perfect state so as to be marketable. However, instead of a laminated face the decorative face could be a polished metal, such as aluminum, a veneer, or any surface which must remain unmarred. The workpiece 26 surface to be machined must be held to within strict tolerances of the desired dimension. Accurate machining cuts are required so that the workpiece 26 may be mounted on other workpieces so as to assemble the desired product without displaying any imperfections on the decorative surfaces.

In operation, the workpiece 26 is introduced to the face molding machine 10 as shown in FIG. 1 at the left hand side. The workpiece 26 is placed on the movable belt 14. As the movable belt 14 rotates in a clockwise direction as shown in FIG. 2 the workpiece 26 is drawn into the face molding machine 10. As shown in FIG. 3, the workpiece 26 is oriented on the movable belt 14 so that the decorative laminate surface of the workpiece 26 is in contact with the movable belt 14.

Before the workpiece 26 enters the machine, the track rollers 16 attached to the arms 20 are pneumatically actuated by the track roller slides 22 to locate and maintain the track roller 16 as close as possible to the surface of the movable belt 14. The track rollers 17 attached to lateral guide blocks 60 as shown in FIG. 4 and the track rollers 19 attached to bevel guide blocks 90 as shown in FIG. 6 are urged towards the surface of the movable belt 14 by springs 63 and 94, respectively. The pneumatic actuators are displayed in FIG. 11 as being connected with the remainder of the pneumatic circuit.

When the workpiece 26 enters the face molding machine 10, the workpiece 26 displaces the track rollers 16 attached to the arms 20 in a vertical direction. The displacement of the track rollers 16 connected to the arms 20 imparts a force on the workpiece 26 so as to urge the workpiece 26 toward the movable belt 14. Likewise, the workpiece 26 displaces the track rollers 17 connected to the yoke plates 58 and the track rollers 19 connected to the pivot plates 88 in horizontal and oblique bevel directions as shown in FIGS. 4 and 6, respectively. The track rollers 17, 19 attached to the yoke plates 58 and the pivot plates 88 urge the workpiece 26 towards the movable belt 14, due to compression of the springs 63, 94, respectively. The track rollers 16, 17, 19 secure the workpiece 26 to the movable belt 14.

As the movable belt 14 rotates in a clockwise direction as shown in FIG. 2 under the power of the motor 50, the movable belt 14 draws the workpiece 26 into the face molding machine 10. The force imparted by the track rollers 16, 17, 19 onto the workpiece 26 generates a frictional force between the laminated surface of the workpiece 26 and the associated contact surfaces of the movable belt 14. The frictional force generated at that interface is the only force that propels the workpiece 26 through the face molding machine 10. The track rollers 16, 17, 19 do not drive the workpiece 26 into the face molding machine 10; the track rollers 16, 17, 19 merely idle in a passive manner and are rotated by a frictional force generated between the surface of the track rollers 16, 17, 19 and the associated contacting surfaces of the workpiece 26.

The relatively small diameter of the track rollers 16, 17, 19 allow for the use of many of the track rollers 16, 17, 19 along the length of the movable belt 14. The use of many track rollers 16, 17, 19 allow shorter lengths of workpiece 26 material to be processed by the face molding machine 10. Furthermore, the track rollers 16, 17, 19 can be placed closer to the cutter of the spindle machines than were prior art machines, thus, the workpiece 26 is held in a more stable manner during the cutting operation. Such stable holding of the workpiece 26 results in a high quality, closely dimensioned cut. Adjacent track roller axes of rotation can be located approximately one track roller diameter away from each other, as long as adjacent track rollers do not rub against each other. Otherwise, the furthest apart the track rollers need be apart is to span the cutting tool so as not to interfere with the cutting operation. In this embodiment the track rollers 16, 17, 19 are manufactured by Torrington model number CRS-16 having a diameter of 1 inch, a width of 0.75 inches, and made of steel.

As the workpiece 26 proceeds to move to the right, as shown in FIGS. 1 and 2 toward the router 34, the workpiece 26 experiences its first machining operation. Track rollers 17 straddle the bit of the router 34. As shown in FIG. 4, the workpiece 26 has a portion of its top surface removed by the bit of the router 34. The depth of the cut performed by the routing operation is controlled by the vertical positioning device called a MIC-RO-JUST 52 manufactured by Stilson, model number MRJ-8096-S. The MIC-RO-JUST 52 moves the router 34 in the vertical direction so as to vary the depth of the cut taken out of the workpiece 26. The rotation of the bit of the router 34 is in a clockwise direction as seen in FIG. 2. That is, the router 34 removes material from the workpiece 26 in a direction opposite of the feed direction. However, the router 34 could be operated in the opposite direction. The router rotates at conventional industry standard speeds readily determined by one of ordinary skill in the art as needed based upon the type of workpiece involved. The router 34 is only activated if the proximity switch 24 generates a signal, based on the distance from the end of the proximity switch to the target mounted on the arm 20, which exceeds a set value of workpiece 26 thickness, otherwise the router 34 is not activated. The arm 20 moves in response to the thickness of the workpiece 26.

As the workpiece 26 exits the vicinity of the router 34 the workpiece 26 is once again urged against the surface of the movable belt 14 by track rollers 17, 16 in the horizontal and vertical directions as shown in FIG. 2 in the vicinity of the hogging spindle 36. The hogging spindle 36 performs a cutting operation on the surface of the workpiece 26 in a location in between adjacent track rollers 16. FIG. 5 displays the amount of material which will be removed by the cutter 108 of the hogging spindle 36, as the workpiece 26 is continuously moved through the face molding machine 10.

The amount of material removed from the workpiece 26 by the hogging spindle 36 is controlled by adjustments made to the first and second slides 40, 38 of the hogging spindle 36 as shown in FIGS. 1, 2 and 5. The first hogging spindle slide 40 is attached to a first hogging spindle mounting bracket 48, the mounting bracket 48 is attached to the frame 12. The first hogging spindle slide 40 allows for linear motion along its longitudinal axis which is adjusted by a hand crank which is shown in FIG. 5. Mounted to a movable surface of the first hogging spindle slide 40 is a second hogging spindle slide 38. The adjustable linear longitudinal axis of the second hogging spindle slide 38 is oriented perpendicular to the longitudinal axis of the first hogging spindle slide 40. Attached to the output of the second hogging spindle slide 38 is the hogging spindle 36. The second hogging spindle slide 38 is adjusted by a hand crank. By adjusting the first and second hogging spindle slides 38, 40 the location and depth of the cut of material removed from the workpiece 26 is easily and stably achieved. The cutter 108 of the hogging spindle 36 rotates in such a direction so as to remove material in a direction opposite the feed direction of the workpiece 26. The cutter 108 rotates at conventional industry standard speeds. However, the hogging spindle 36 can be operated in a direction so as to remove material from the workpiece 26 in the feed direction. The cutter 108 is made of material which is conventional in the industry for the type of workpiece material to be cut.

FIG. 6 displays a cross section of the workpiece 26 and of the face molding machine along section line 6—6 of FIG. 1. FIG. 6 displays the cut performed on the workpiece 26 by the hogging spindle 36. FIG. 6 further illustrates the use of track rollers 19 used to urge the workpiece 26 toward the movable belt 14 at the location of the bevel cut performed by the hogging spindle 36. The operation, mounting and attachment of the track rollers 19 are similar to that of track rollers 17 of the previous embodiment. As the workpiece 26 continuously proceeds through the face molding machine 10 it nears the vicinity of the finishing spindle 42.

The finishing spindle 42 removes material from the workpiece 26 in the same orientation as the hogging spindle 36. However, the finishing spindle 42 removes only a small amount of material as compared to the amount of material removed from the workpiece 26 by the hogging spindle 36. The finishing spindle 42 has its location manually adjusted by the first and second finishing spindle slides 44, 46. The finishing spindle slides 44, 46 operate in the same manner as do the first and second hogging spindle slides 38, 40 of the hogging spindle 36. The finishing spindle 42 imparts a high quality, accurately dimensioned surface cut on the workpiece 26. The finishing spindle 42 removes material from the workpiece 26 in a direction opposite to the feed direction of the workpiece 26. The cutter of the finishing spindle 42 rotates at conventional industry standard speeds. However, the finishing spindle 42 can be operated in a direction so as to remove material from the workpiece 26 in the feed direction.

FIG. 7 displays a cross section of the workpiece 26 and of the face molding machine 10 along line 7—7 of FIG. 1. At this location processing of the workpiece 26 on this machine has been completed. As can be seen in FIG. 7 the workpiece 26 has been cut along its top and a bevel surface has been created on its side. The surface of the workpiece 26 which has a laminated surface is not damaged since substantially no relative motion has occurred between that surface and the associated contacting surface of the movable belt 14.

Figure 12A:
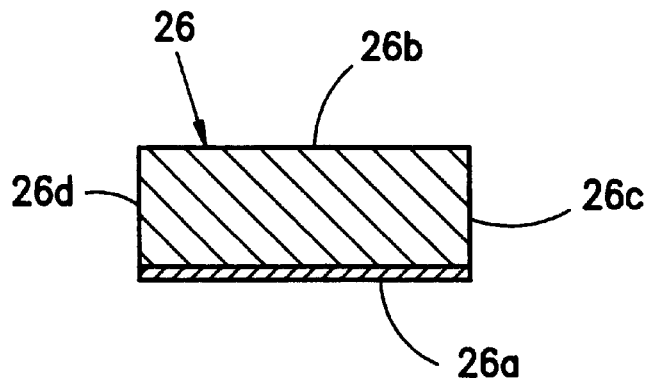
FIGS. 12a, 12b, 12c, and 12d display the processing of the workpiece, in cross-section, as it moves through the face molding machine.

FIGS. 12a–12d display the processing of the workpiece 26 in cross-section as it moves through the face molding machine 10, the view is looking upstream. FIG. 12a displays a cross-section of the workpiece 26 before it is processed. Surface 26a of the workpiece 26 is the laminated, decorative surface. Surfaces 26b and 26d are surfaces which are processed. Surfaces 26a and 26c contact the movable belt 14.

Figure 12B:
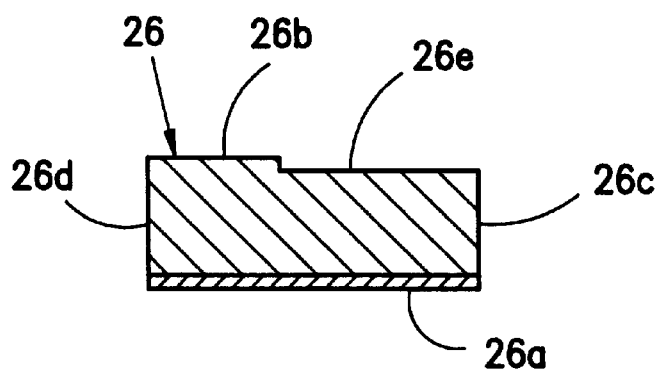

FIG. 12b displays a cross-section of the workpiece 26 after it has been cut by the router 34, if necessary, as discussed above. The router operation creates the surface 26e.

Figure 12C:
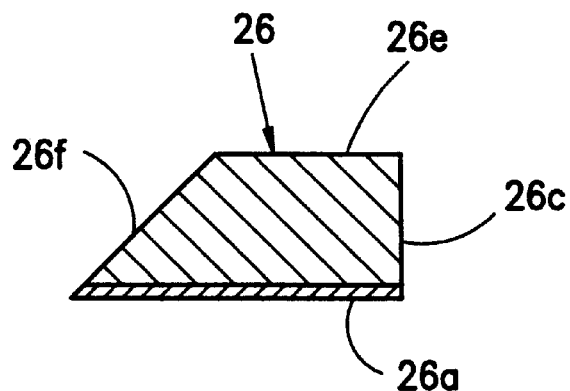

FIG. 12c displays a cross-section of the workpiece 26 after it has been cut by the hogging spindle 36. The hogging spindle operation creates surface 26f.

Figure 12D:
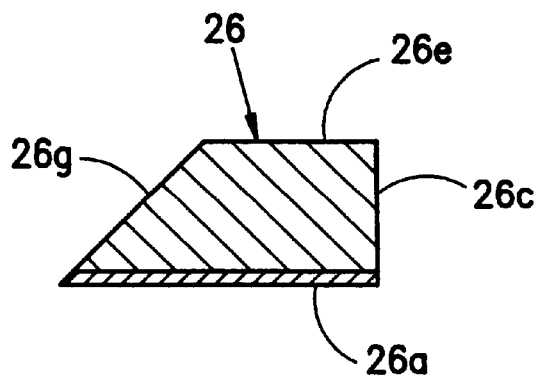

FIG. 12d displays a cross-section of the workpiece 26 after it has been cut by the finishing spindle 42. The finishing spindle operation creates surface 26g.

Other spindles and routers can be used with the concept of the movable belt. Also different orientations of the cutting angles may be used with the embodiment described above.

In another form of the invention, the high-accuracy machine takes the form of a bevel molding machine 110. The form of the bevel molding machine 110 is similar to that of the face molding machine 10. As in the face molding machine 10, the bevel molding machine 110 has a movable belt, track rollers, a slider bed, a motor, a frame, a spindle and cutter, and pneumatic actuators. Some of the parts are the same as those used one the face molding machine 10 and used in the same manner; other parts differ in the number of parts used and in the orientation of the part relative to other parts. For instance, the bevel molding machine 110 employs a single spindle instead of two spindles employed on the face molding machine 10 and further does not employ the use of a router. Therefore, only a short description of the bevel molding machine will be provided which describes its function and how it differs from the face molding machine 10.

Figure 13:
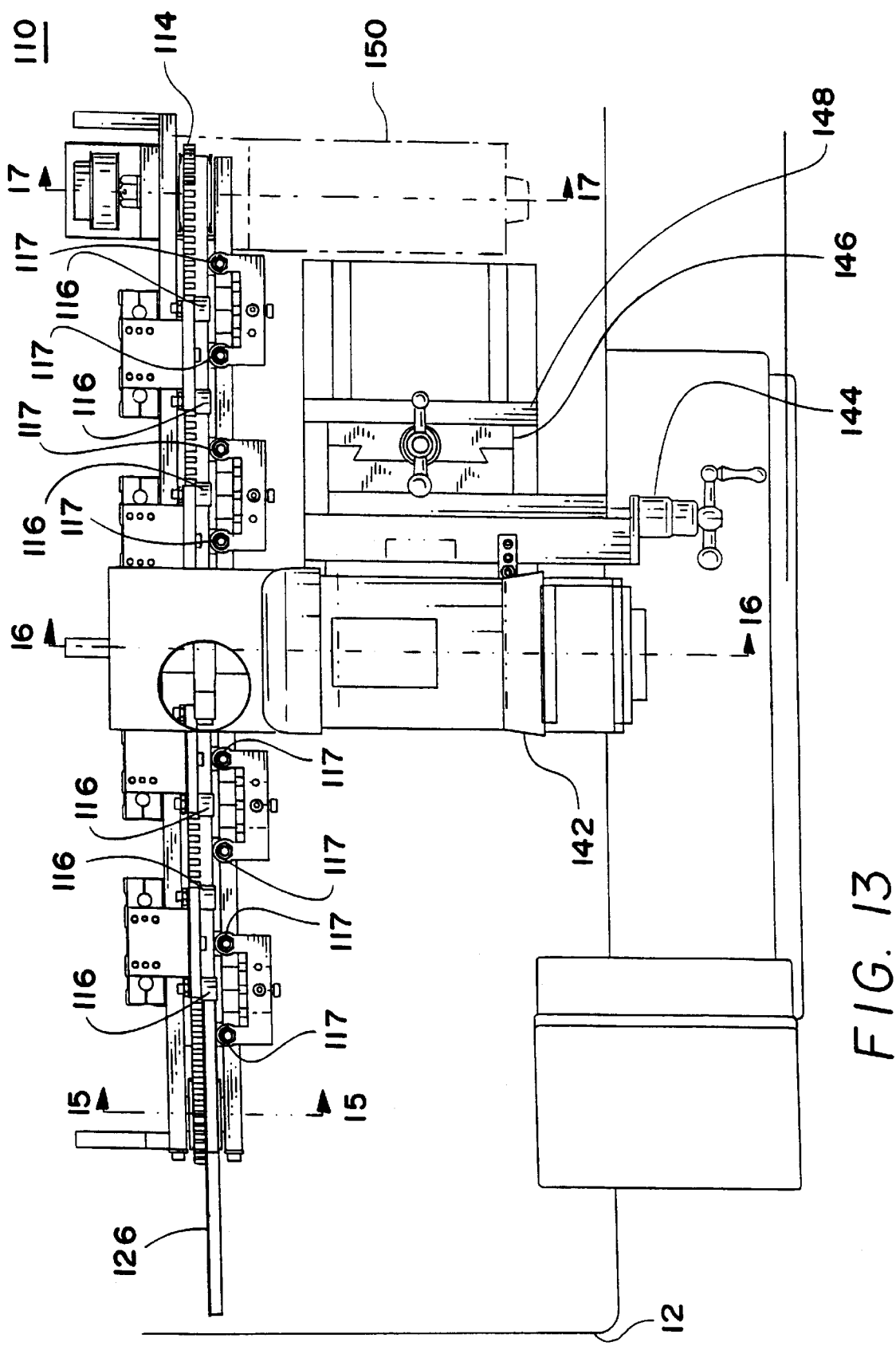
FIG. 13 is a plan view of the bevel molding machine.

FIG. 13 is a plan view of the bevel molding machine which includes the frame 112, the movable belt 114, the numerous track rollers 116, 117 positioned about the movable belt 114, the finishing spindle 142, and the drive motor 150 shown in phantom line.

Figure 14:
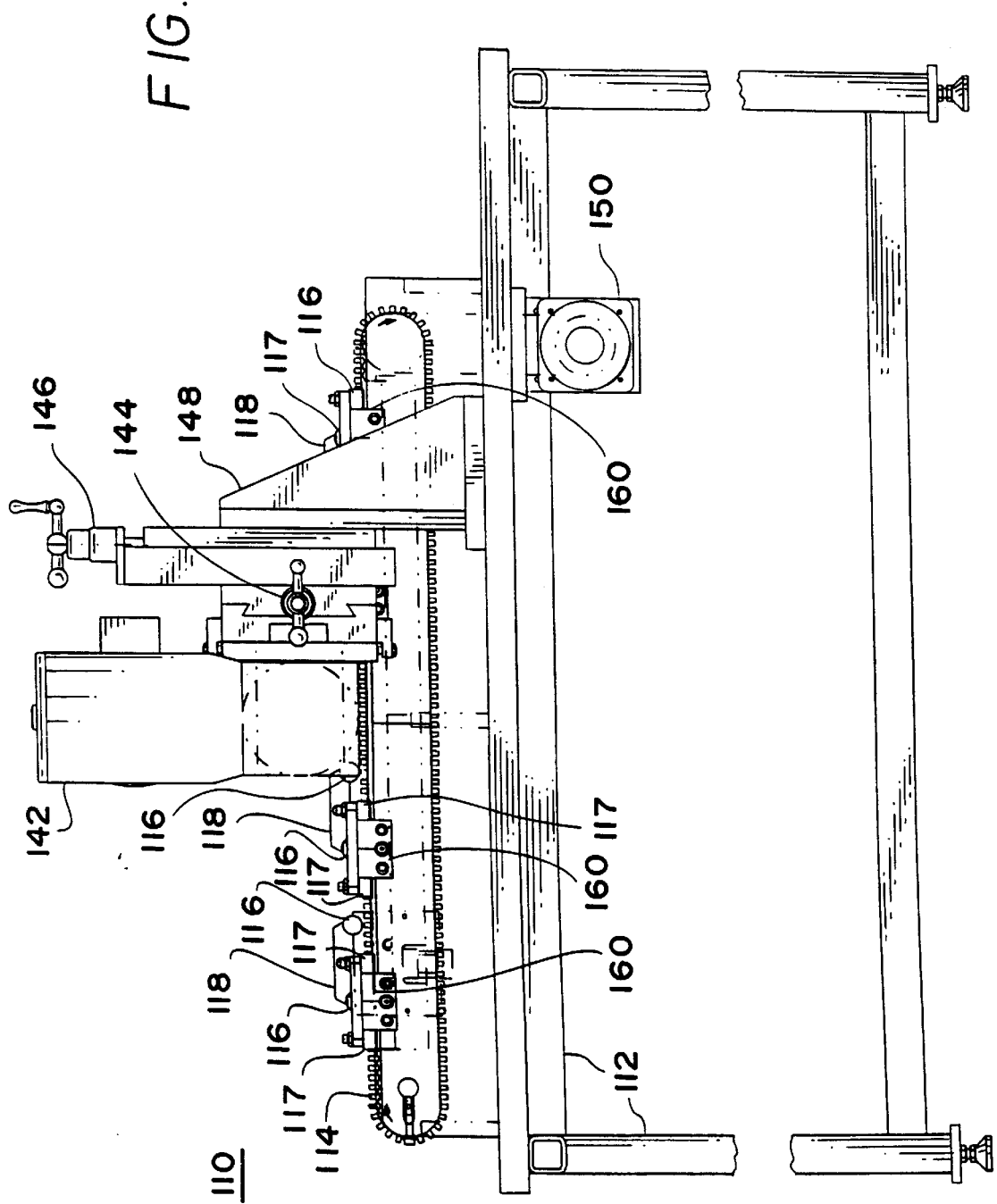
FIG. 14 is a front view of the bevel molding machine.

FIG. 14 is a front view of the bevel molding machine 110 which displays the general layout of the machine including the frame 112, the movable belt 114, the numerous track roller 116, 117, the finishing spindle 142, and the motor 150.

Figure 15:
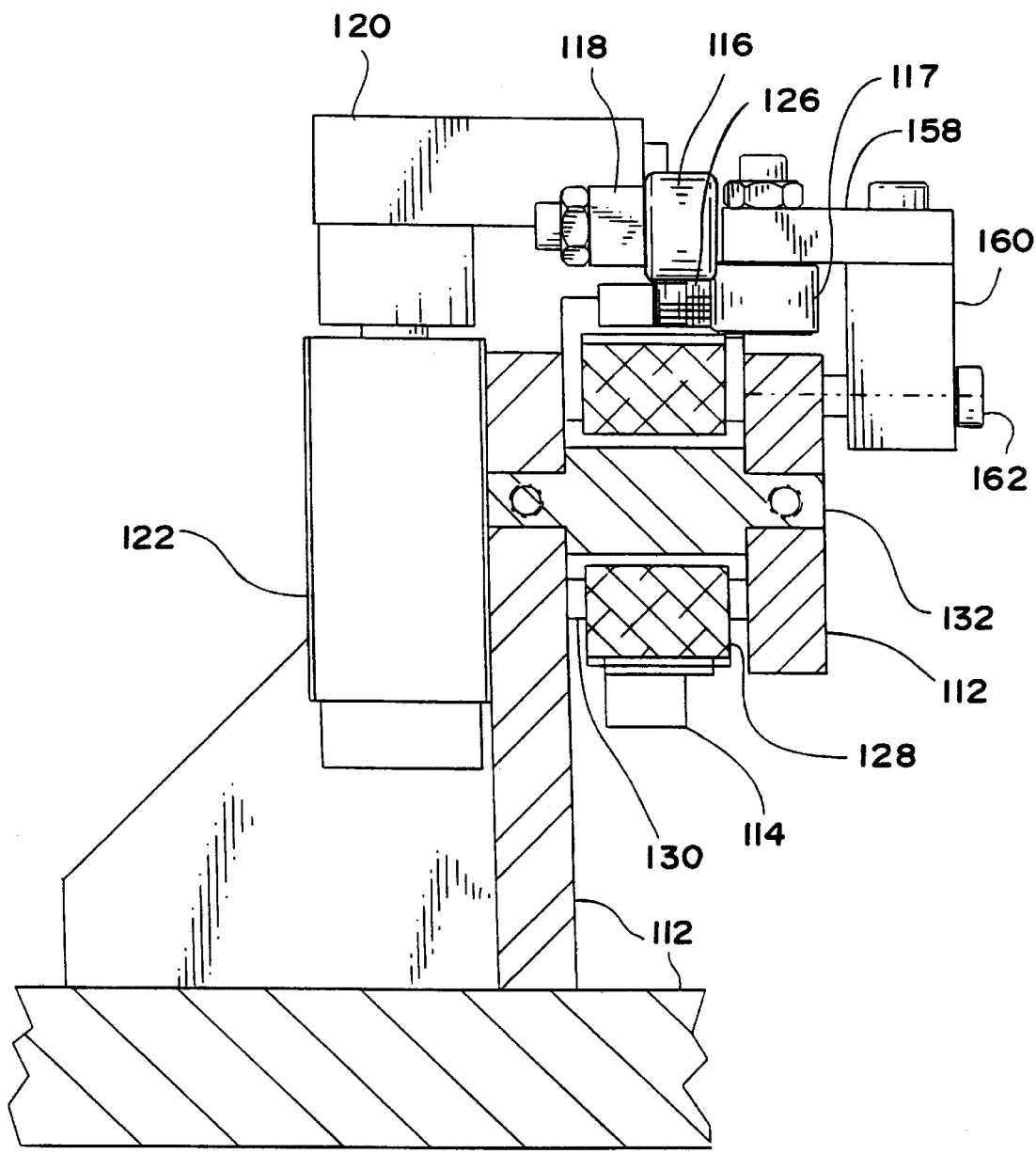
FIG. 15 is a partial cross-sectional view taken along section line 15—15 of FIG. 13, displaying the inlet area of the bevel molding machine.

FIG. 15 is a partial cross-sectional view taken along section line 15—15 of FIG. 13. FIG. 15 displays how the leading idler shaft 132 fits in the frame 112, and around which the bearing 130 is positioned. The leading pulley 128 is mounted about bearing 130. The movable belt 114 is rotatably connected to the leading pulley 128. Atop the movable belt 114 is positioned the workpiece 126. The workpiece 126 is secured by frictional force to the movable belt 114. The frictional force is generated by the downward pressure of the track roller 116 which is connected to the yoke 118, which is able to rotate about its centerline. The yoke 118 is connected to the arm 120, which is connected to a track roller slide 122. The track roller slide 122 is connected to the frame 112. As in the previous embodiment, the track roller slide 122 is a pneumatic actuator. Both track roller slides 22, 122 operate in the same manner, are of the same size and manufacture. Again, as before, FIG. 11 is a schematic of the pneumatic system of the face molding machine 10 and the bevel molding machine 110. The same description of the pneumatic system applies to this embodiment.

Track rollers 117 are of the same size, operate the same way, mount the same way, and are urged toward the workpiece as are track rollers 17 of the previous embodiment. Thus, the operation of these track rollers will not be discussed.

Figure 16:
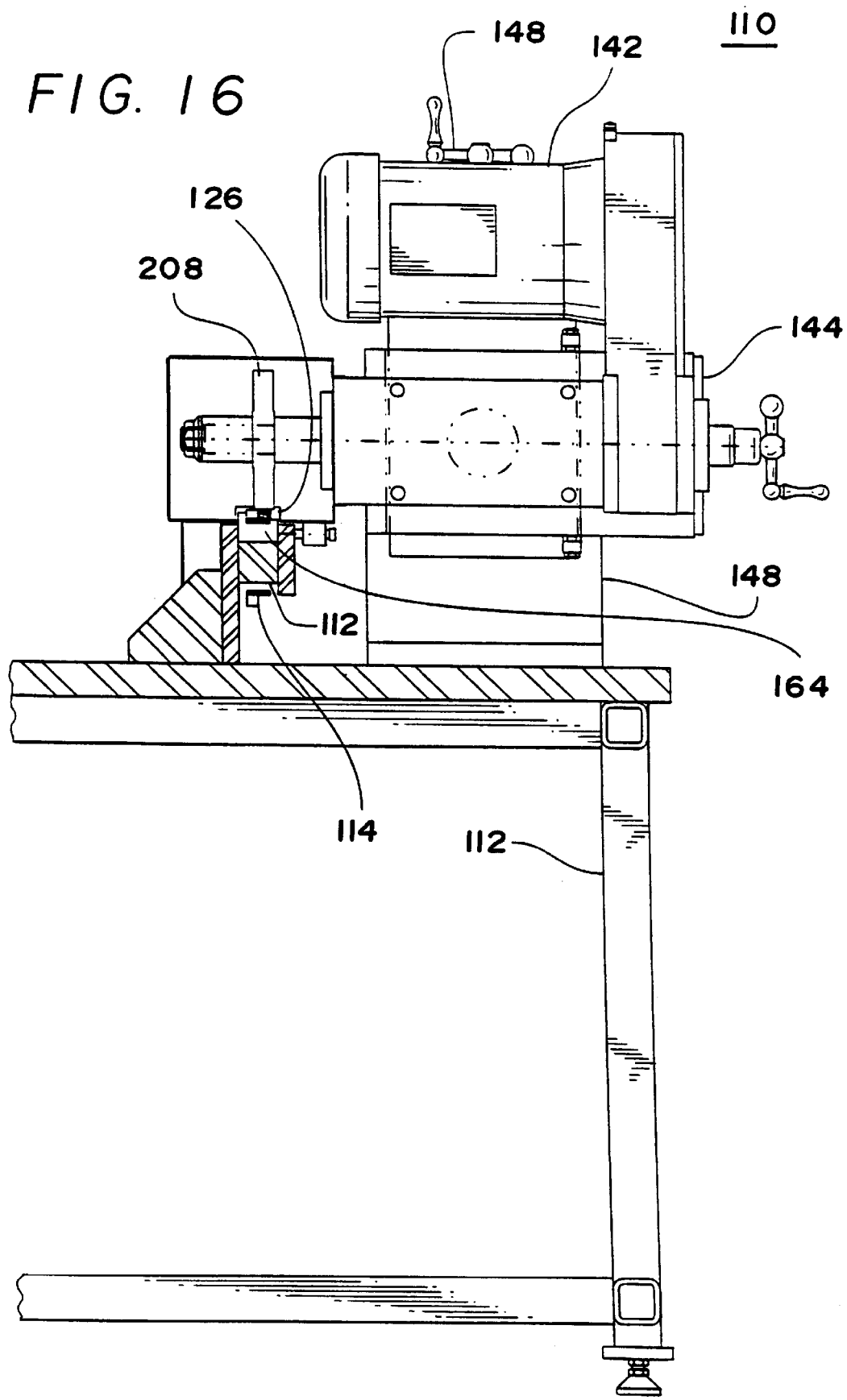
FIG. 16 is a partial cross-sectional view along line 16—16 of FIG. 13, displaying the area near the finishing spindle of the bevel molding machine.

FIG. 16 is a partial cross-section view along line 16—16 of FIG. 13, showing the machine in the vicinity of the finishing spindle 142. FIG. 16 displays a finishing spindle mounting bracket 148 connected to the frame 112. As shown in FIGS. 13, 14, and 16 a first finishing spindle slide 146 is connected to the finishing spindle mounting bracket 148. The first finishing spindle slide 146 provides linear motion along its longitudinal axis. Connected to one surface of the first finishing spindle slide 146 is a surface of the second finishing spindle slide 144. The second finishing spindle slide 144 provides for linear motion along its longitudinal axis which is perpendicular to the longitudinal axis of the first finishing spindle slide 146. Connected to a surface of the second finishing spindle slide 144 is the finishing spindle 142. As shown in FIG. 16 the finishing spindle 142 has a finishing cutter 208.

Further illustrated in FIG. 16 is the position of the slider bed 164 attached to the frame 112, the movable belt 114 rotatably mounted on the slider bed 164, and the workpiece 126 positioned on the movable belt 114. The slider bed 164 supports the movable belt 114 in both the vertical and horizontal directions.

FIG. 17 is a partial cross-sectional view along line 17—17 of FIG. 13, showing the bevel molding machine 110 in the vicinity of the motor 150. The assembly and operation of the motor 150 and associated pulleys 170, 174, 180, power transmission belt 172, idler shaft 176, frame 112, movable belt 114, workpiece 126, and bearings is similar to that of the previous embodiment 10 and will not be discussed further. The linear feed rate of the workpiece is similar to that created in the previous embodiment.

Figure 18A:
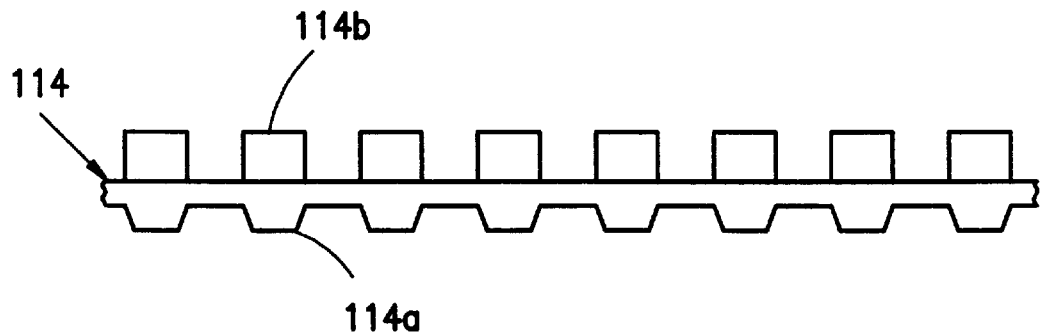
FIGS. 18a–18b display the side and cross-sectional views of the movable belt, respectively, of the bevel molding machine.
Figure 18B:
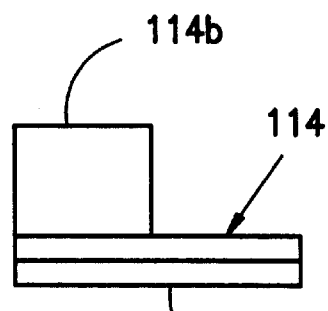

FIG. 18a is a partial side view of the movable belt 114. FIG. 18b is a cross-sectional view of the movable belt 114. The movable belt has cogs 114a on its lower surface so as to positively receive power from the trailing edge pulley 180. The top surface of the movable belt 114 is provided with bearing surfaces or segments of a moving fence 114b integrally attached to the movable belt 114 so as to abut surfaces of the workpiece 126. The movable belt 114 has a circumference of approximately ninety inches. The movable belt 114 is manufactured by the company that makes the movable belt 14 and is constructed of the same material. Movable belt 114 operates in the same manner as movable belt 14 of the previous embodiment.

Figure 19:
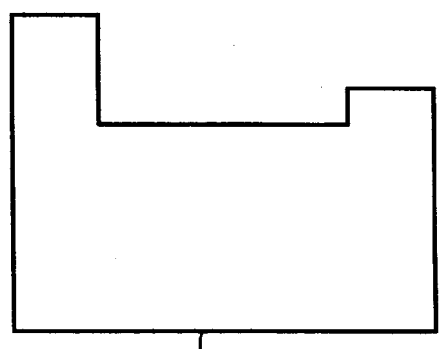
FIG. 19 displays a cross-sectional view of the slider bed of the bevel molding machine.

FIG. 19 is a cross-sectional view of the slider bed 164. The slider bed 164 is manufactured by the company that makes the slider bed 64 and is constructed of the same material. The slider bed 164 operates and functions in the same manner as slider bed 64 of the previous embodiment. The slider bed 164 is approximately thirty-five inches long. The slider bed 164 is dimensioned so as to receive the movable belt 114 with the same type of tolerance between the two parts as were present between the slider bed and movable belt of the previous embodiment.

Figure 20A:
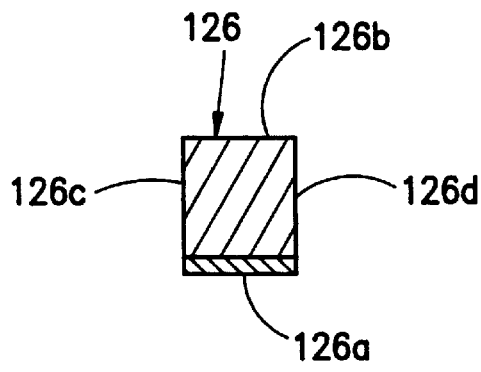
FIGS. 20a–20b display the processing of the workpiece, in cross-section, as it moves through the bevel molding machine.
Figure 20B:
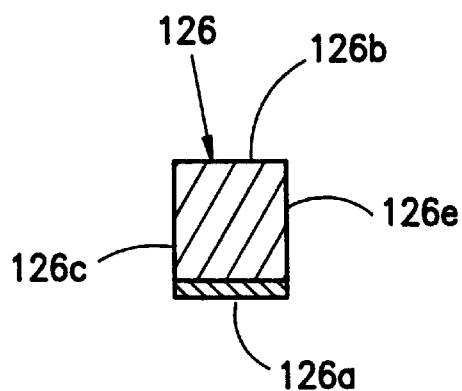

The workpiece 126 is constructed of the same material as is the workpiece 26, but is more of a square-like cross-section of approximately one-half inch by one-half inch in cross-section and of approximately the same length as the previous workpiece 26. FIGS. 20a–20b display the processing of the workpiece 126 in cross-section as it moves through the bevel molding machine 110. FIG. 20a displays a cross-section of the workpiece 126 before it is processed. Surface 126a of the workpiece 126 is the laminated, decorative surface. Surface 126d is the surface to be processed. Surfaces 126a and 126c contact the movable belt 114. Surface 126b is not processed.

FIG. 20b displays a cross-section of the workpiece 126 after it has been cut by the finishing spindle 142. The finishing spindle operation creates surface 126e. Surface 126e of workpiece 126 is accurately machined since it will be bonded to surface 26g of workpiece 26.

The bevel molding machine 110 cuts one surface of a workpiece 126. The surface of the workpiece 126 is processed or cut to high quality, accurate dimensions, since surface 126e will be attached to a cut surface 26g of the workpiece 26 processed by the face molding machine 10.

Figure 21A:
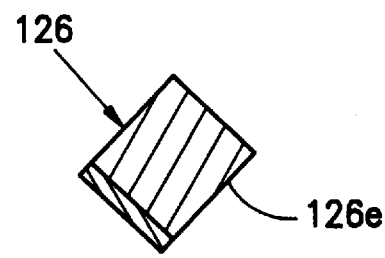
FIGS. 21a, 21b, and 21c display the combination of the workpieces processed by the face molding machine and the workpiece processed by the bevel molding machine so as to create a new workpiece.
Figure 21B:
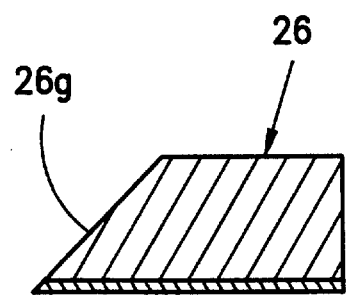
Figure 21C:
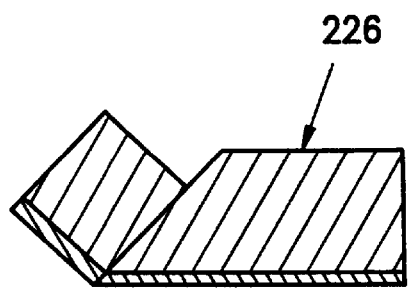

FIGS. 21a–21c display workpieces 26 and 126, respectively. When the workpieces 26 and 126 are bonded together they form a new piece, workpiece 226, as shown on FIG. 21c. Workpieces 26 and 126 are bonded together with a bonding product that is in conformance with industry standards so as to create workpiece 226.

Figure 22:
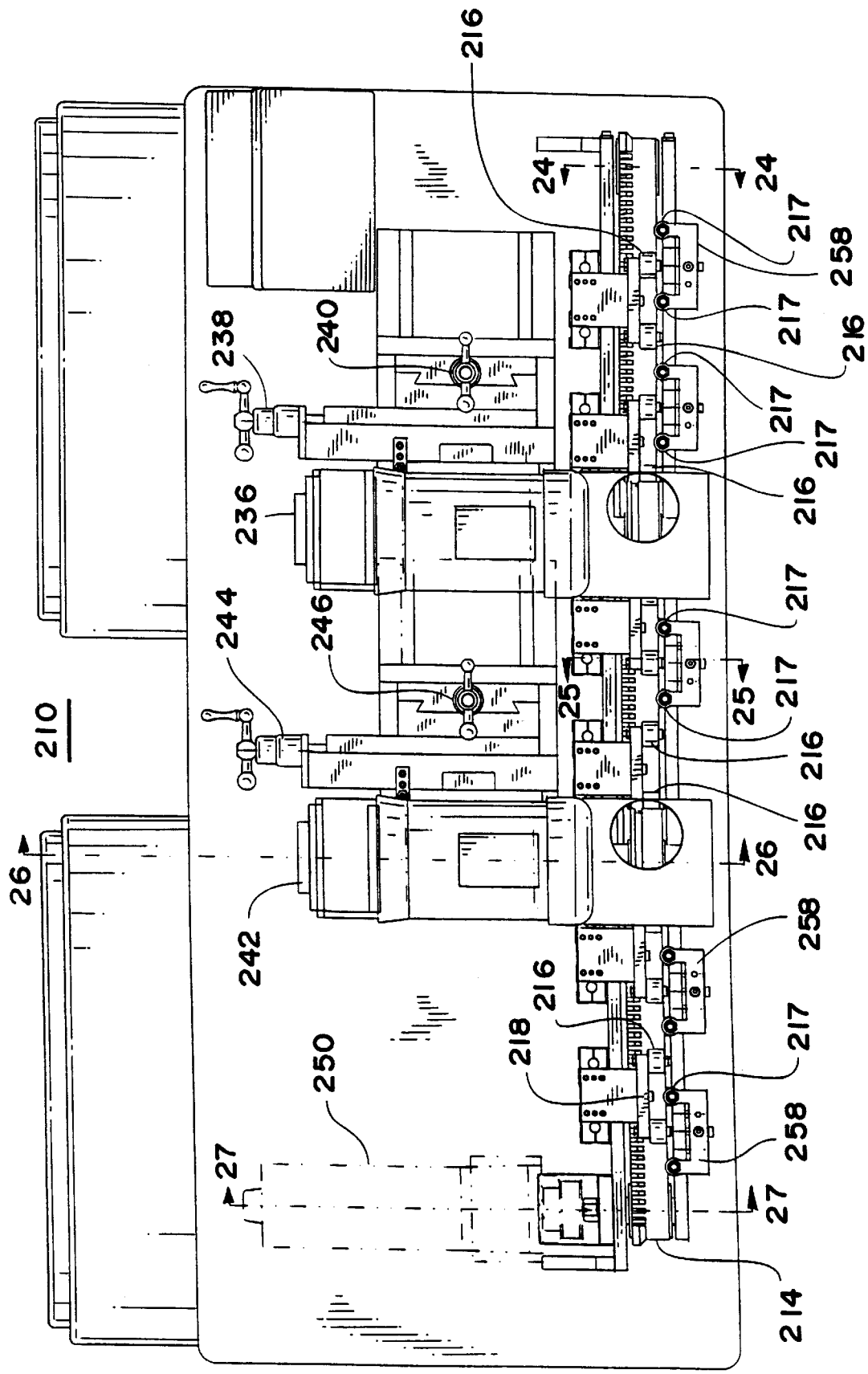
FIG. 22 is a plan view of the first stage bevel edge molding machine.

In another form of the invention, the high-accuracy processing machine takes the form of a first stage bevel edge molding machine 210. FIG. 22 is a plan view of the first stage bevel edge molding machine 210 which displays the general layout of the machine which includes a frame 212, a movable belt 214, the numerous track rollers 216, 217 positioned about a movable belt 214, a hogging spindle 236, a finishing spindle 242, and a drive motor 250 shown in phantom line.

Figure 23:
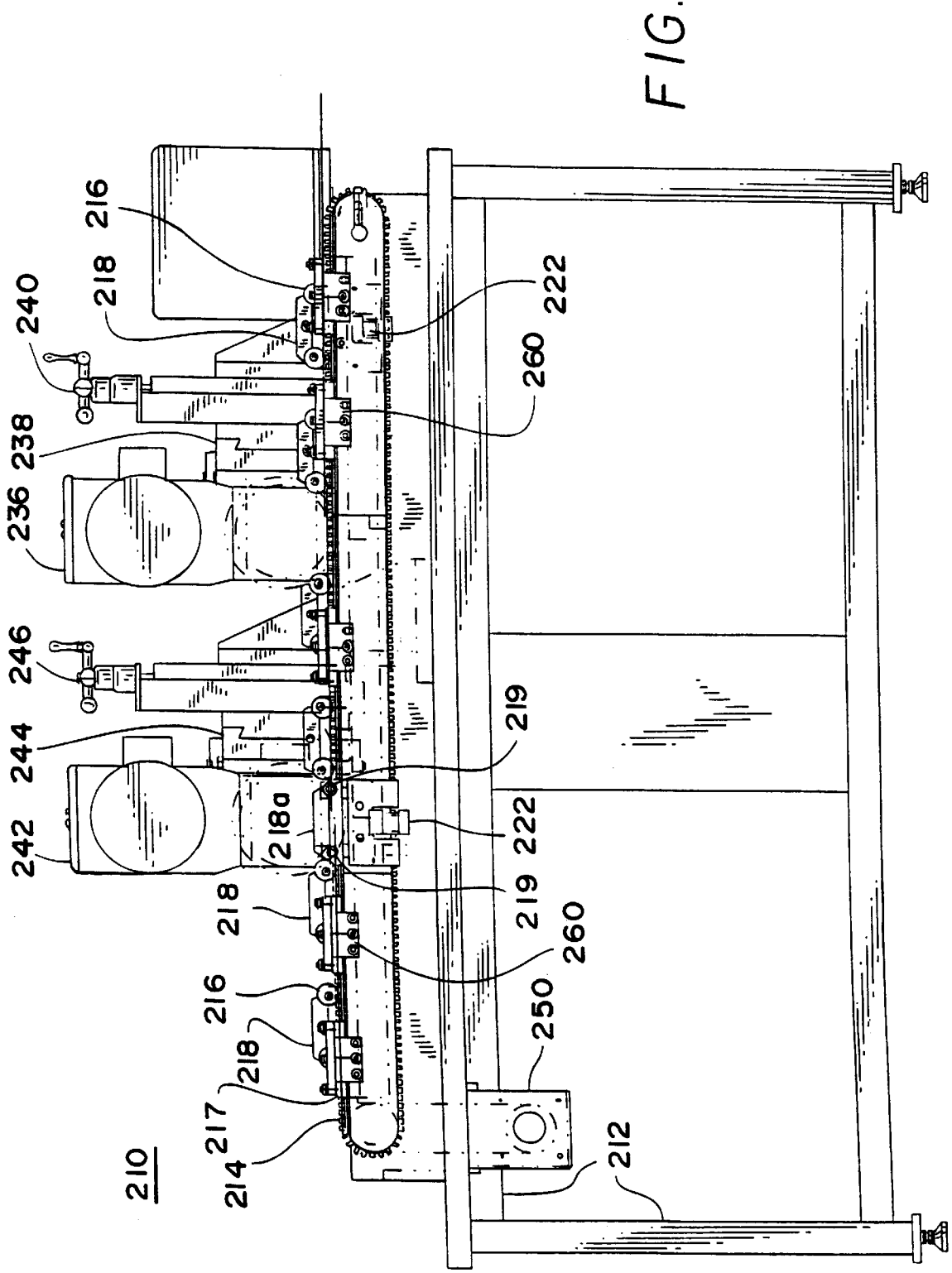
FIG. 23 is a front view of the first stage bevel edge molding machine.

FIG. 23 is a front view of the first stage bevel edge molding machine 210 showing the above mentioned parts along with track rollers 219 and track roller slides 222. Track rollers 219 are smaller than the track rollers used in previous embodiments. Track rollers 219 are mounted and operated similarly to track rollers 216. Track rollers 219 are connected to a small yoke 218a (see FIG. 26). The small yoke 218a is connected to a small arm 220a. The small arm 220a is connected to a track roller slide 222. The track roller slide 222 is connected to the frame 212. Track rollers 219 are manufactured by Torrington and the model number is CRS-8. Track rollers 219 straddle the cutter 308 of the finishing spindle 242.

Figure 24:
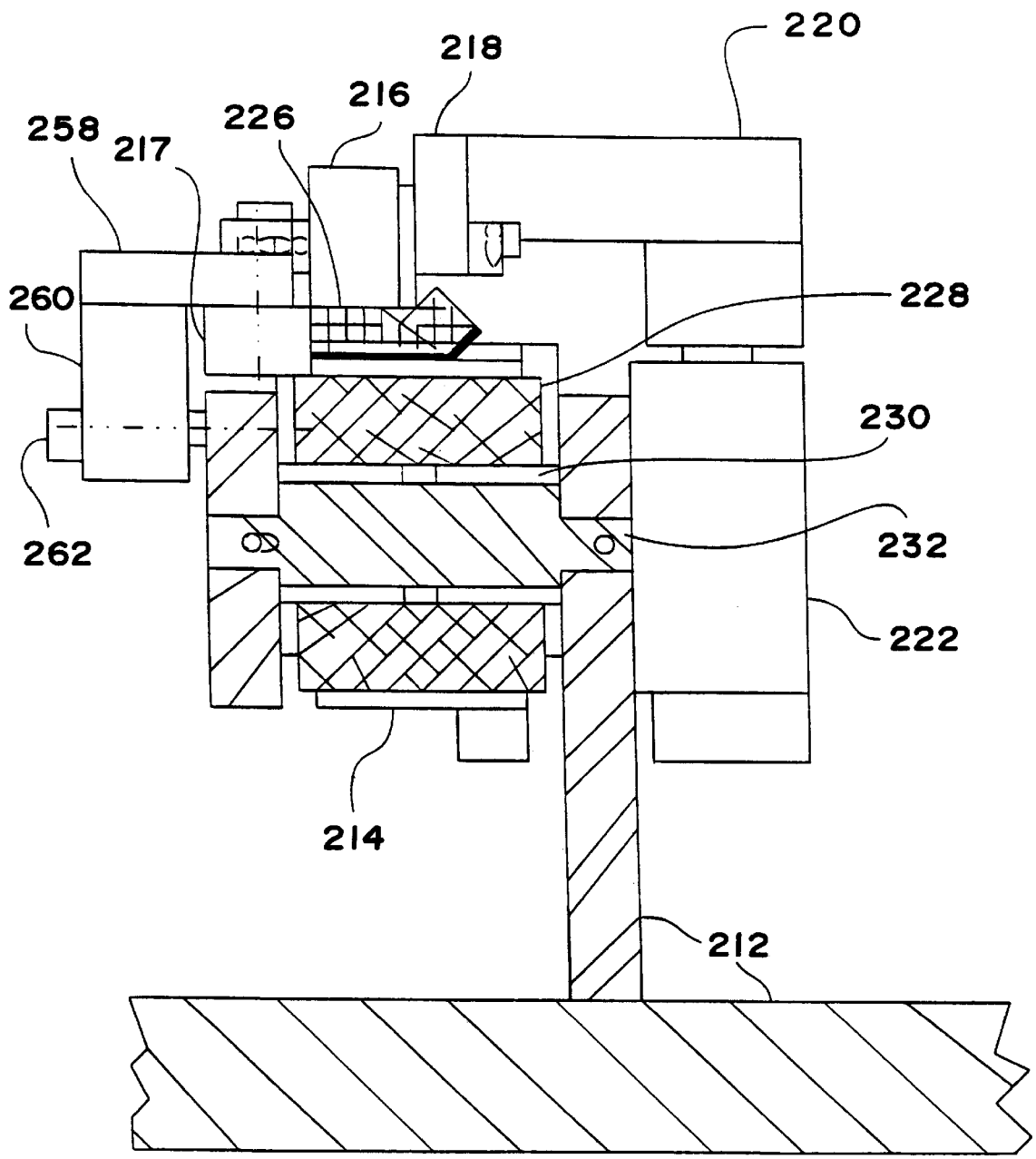
FIG. 24 is a partial cross-sectional view taken along section line 24—24 of FIG. 22 in the vicinity of the first stage bevel edge molding machine inlet.

FIG. 24 is a partial cross-sectional view taken along section line 24—24 of FIG. 22 in the vicinity of the inlet to the machine 210. FIG. 24 displays the frame 212, the track roller slide 222, the leading idler shaft 232 mounted in the frame 212, the bearing 230 surrounding the leading idler shaft 232, the leading pulley 228 mounted on the bearing 230, the movable belt 214 rotatably connected to the leading pulley 228, and the workpiece 226 on the movable belt 214. FIG. 24 further shows the use of track rollers 216 to urge the workpiece 226 towards the movable belt 214. Track rollers 216 are connected to a yoke 218. The yoke 218 is connected to an arm 220. The arm is connected to the track roller slide 222. As in previous embodiments the track roller slide is a pneumatic actuator. Track rollers 216 have a diameter which is larger than the diameter of the previous track rollers 16, 17, 19, 116 of the previous embodiments. Track rollers 216 are larger so as to be able to better secure the workpiece 226 to the movable belt 214. Track rollers 216 are manufactured by Torrington and the model number is YCRS-20.

FIG. 24 also shows the use of track rollers 217 to urge the workpiece 226 towards the movable belt 214. Track rollers 217 are connected to a lateral yoke 258 which is further connected to a lateral guide block 260. The lateral guide block 260 is attached to the frame 212 through use of a shoulder bolt 262.

Figure 25:
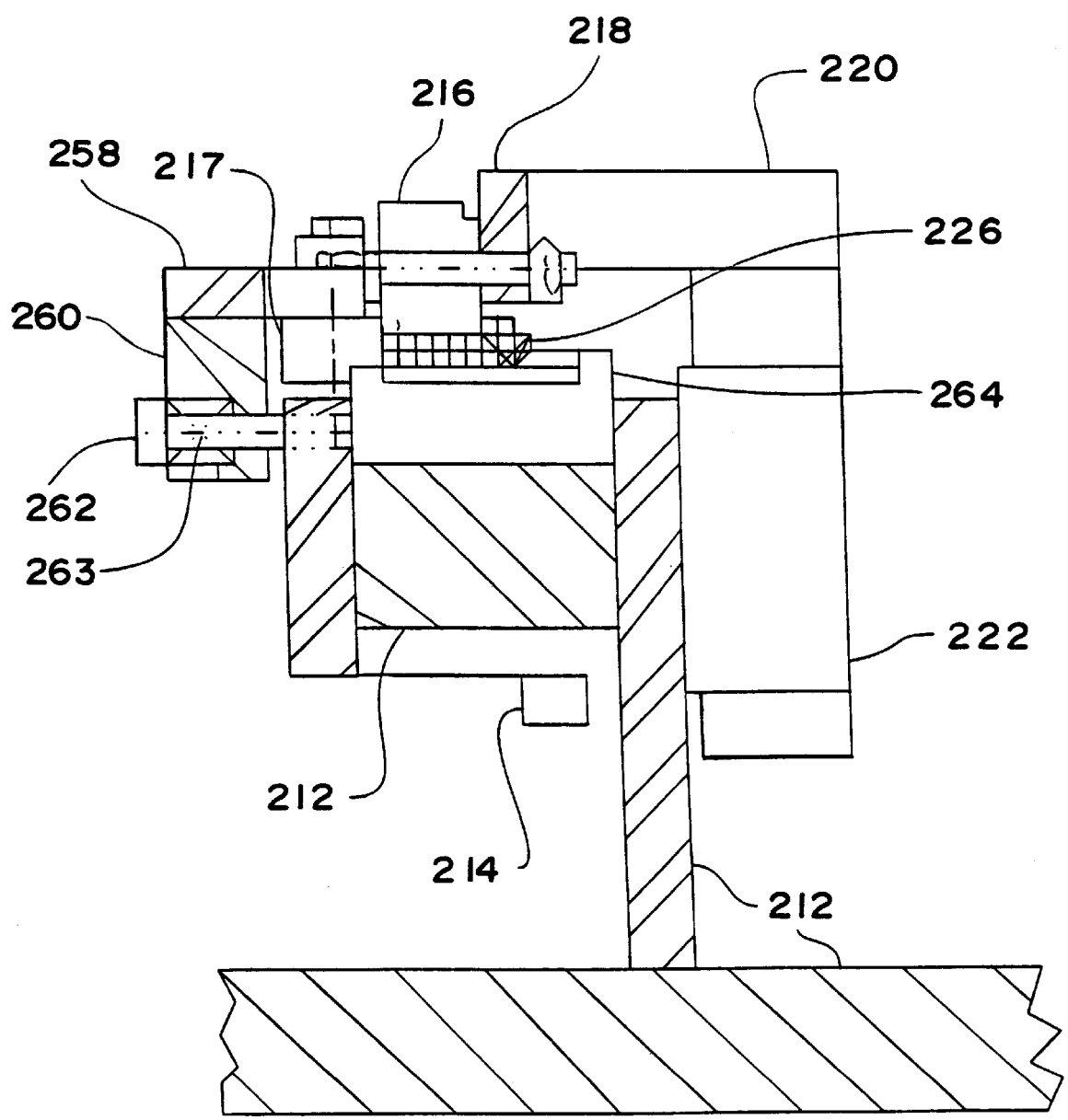
FIG. 25 is a partial cross-sectional view along line 25—25 of FIG. 22 at a location downstream of the hogging spindle of the first stage bevel edge molding machine.

FIG. 25 is a partial cross-sectional view along line 25—25 of FIG. 22 at location downstream of the hogging spindle 236. FIG. 25 illustrates the use of the track rollers 216, 217, further illustrated is the element used to urge the track rollers 217 towards the workpiece 226. A lateral spring 263 is interposed between the lateral guide block 260 and the shoulder bolt 262 so as to enable the track roller 217 to urge the workpiece 226 against the movable belt 214. The lateral springs 263 are the same as the springs of previous embodiments. Also shown is the slider bed 264 mounted on the frame 212, and the movable belt 214 slidably mounted on the slider bed 264. FIG. 25 further illustrates the cross-section of the workpiece 226 after it has exited the hogging spindle 236.

Figure 26:
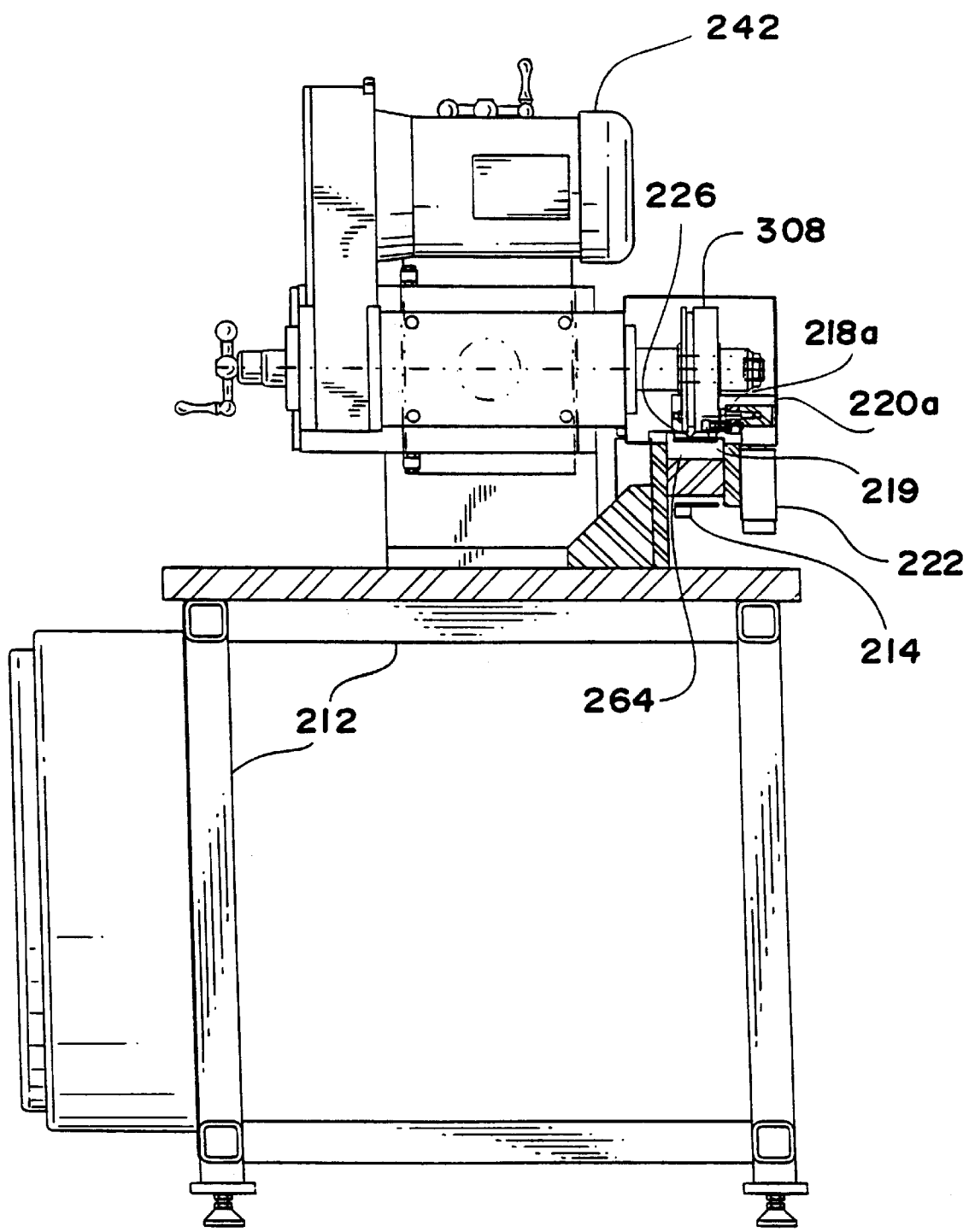
FIG. 26 is a partial cross-sectional view along line 26—26 of FIG. 22 along the centerline of the cutter of the finishing spindle of the first stage bevel edge molding machine.

FIG. 26 is a partial cross-section view along line 26—26 of FIG. 22 along the centerline of the cutter 308 of the finishing spindle 242. As discussed in reference to FIG. 23, the track rollers 219 which are actuated pneumatically by one of the track roller slides 222 are positioned closely about cutter 308. The track rollers 219 are relatively small so that the workpiece 226 is securely held against the movable belt while cutter 308 removes material from the workpiece 226. Thus, track rollers 219 keep the workpiece 226 stable during this critical cutting operation.

Figure 27:
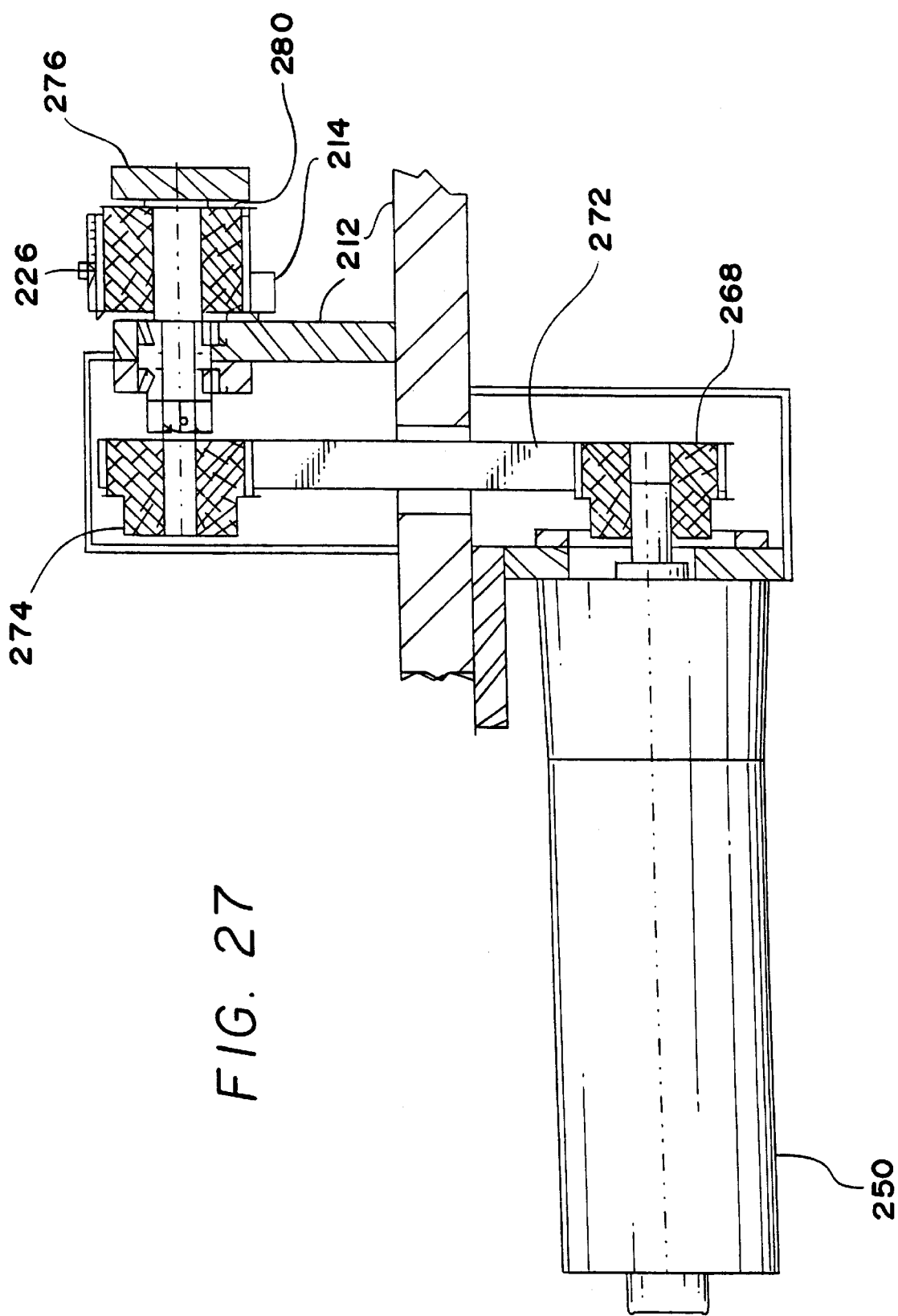
FIG. 27 is a partial cross-sectional view along line 27—27 of FIG. 22, displaying the first stage bevel edge molding machine in the vicinity of the drive motor.

FIG. 27 is a partial cross-section view along line 27—27 of FIG. 22, showing the first stage bevel edge molding machine 210 in the vicinity of the drive motor 250. The assembly and operation of the motor 250 and associated pulleys 268, 274, 280, power transmission belt 272, idler shaft 276, frame 212, movable belt 214, workpiece 226, and bearings is similar to that of the previous embodiments 10 and 110 and will not be discussed further. The linear feed rate of the workpiece 226 created by the motor 250 is similar to those of the previous embodiments.

Figure 28A:
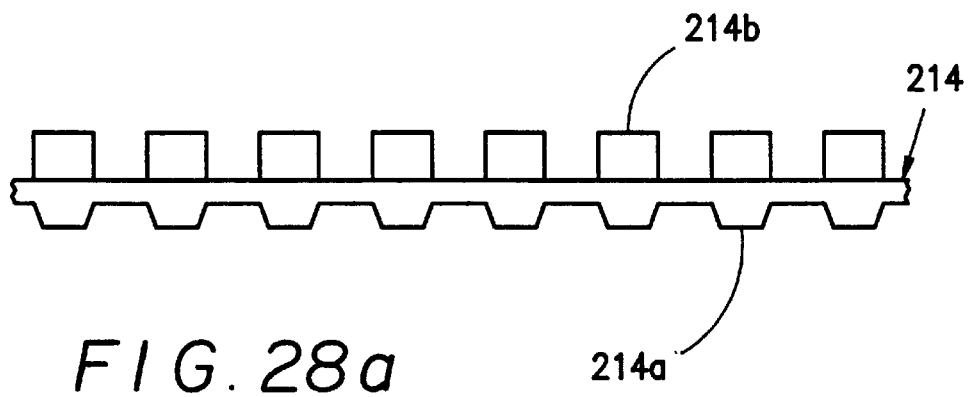
FIGS. 28a–28b display a partial side view and cross-sectional view of the movable belt, respectively, of the first stage bevel edge molding machine.

FIG. 28a is a partial side view of the movable belt 214 showing its cogs 214a on the lower surface so as to positively receive power from the drive motor pulley. Also shown is the segmented moving fence 214b which the workpiece contacts. The movable belt has a circumference of approximately 127 inches. The width of one segment 214b of the fence is approximately one-quarter inch. The height from the planar surface of the movable belt to the bottom of the cogged portion is approximately 0.164 inches. The movable belt 214 is made by the same manufacturer and materials as are the movable belts 64, 164 of the previous embodiments.

Figure 28B:
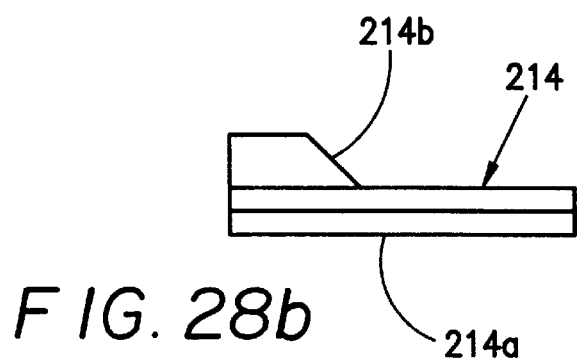

FIG. 28b displays a cross-section of the movable belt 214. Since the workpiece 226 has a beveled edge the fence 214b of the movable belt 214 also has complementary beveled edge so as to support the workpiece 226. The bevel of the fence 214b is approximately at a forty-five degree angle. The bottom portion of the fence 214b has a width of approximately 0.730 inches and the height of the fence 214b from the surface of the movable belt is approximately 0.280 inches. The approximate width of the movable belt is two inches.

Figure 29:
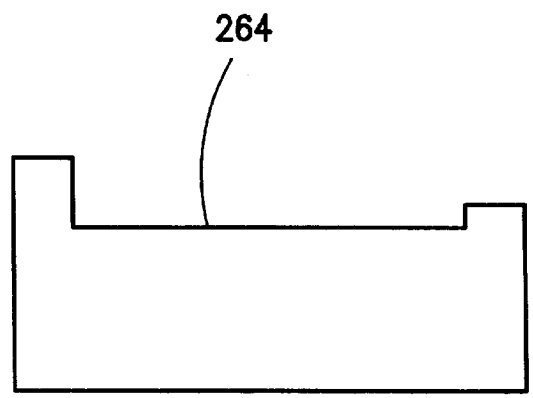
FIG. 29 is a cross-sectional view of the slider bed of the first stage bevel edge molding machine.

FIG. 29 is a cross-sectional view of the slider bed 264. The slider bed 264 is approximately fifty-four inches long. The width along the bottom is approximately 2.676 inches. The height on the left side is approximately 1.26 inches, the width on the upper right side is approximately 0.338 inches, the height on the right side is approximately 0.979 inches and the width of the upper base portion where the movable belt 214 contacts the slider bed 264 is approximately 2.005 inches. The slider bed 264 is made by the same manufacturer and material as in the slider beds 64, 164 of the previous embodiments.

Figure 30:
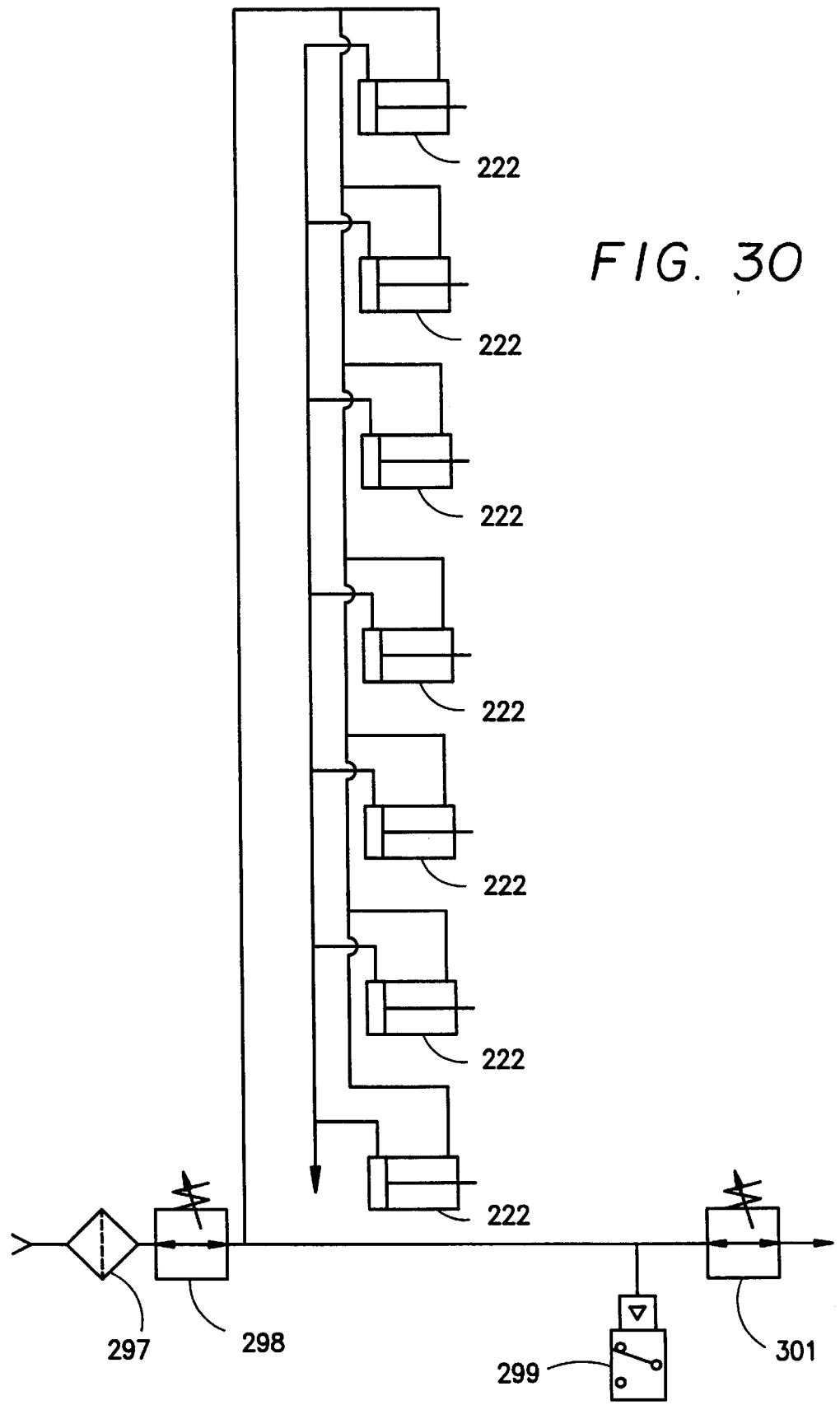
FIG. 30 is a schematic of the pneumatic system of the first stage bevel edge molding machine.

FIG. 30 is a schematic of the pneumatic system of the first stage bevel edge molding machine 210. The pneumatic system, operation, pressures, pneumatic actuators and flow-rates are similar to those of previous embodiments discussed and shown in FIG. 11. The pneumatic actuators displayed therein are the track roller slides 222. FIG. 30 further illustrates the pneumatic actuators 222 used to urge the track rollers 216 and 219 against the workpiece 226. Air pressure is supplied from a compressor (not shown) which is attached to the filter regulator 297. The pneumatic system is activated by a pressure switch 299. The pneumatic schematic further shows that accessories can be attached to the pneumatic line adjacent to the regulator 301.

The form and operation of the first stage bevel edge molding machine 210 is similar to that of the face and bevel molding machines 10 and 110. Thus, only a short description of the operation of the first stage bevel edge molding machine 210 will be provided.

Each of the spindles 236 and 242 are mounted to a pair of linear spindle slides which allow each of the spindles 236, 242 to have adjustable positions, positions of which can be locked-in or maintained by the spindle slides. The spindle slides 238, 240 of the hogging spindle 236 and the spindle slides 244, 246 of the finishing spindle 242 serve a similar purpose, operate in a similar manner, and are mounted to the frame and to the spindles in a manner similar to previous embodiments.

Figure 31A:
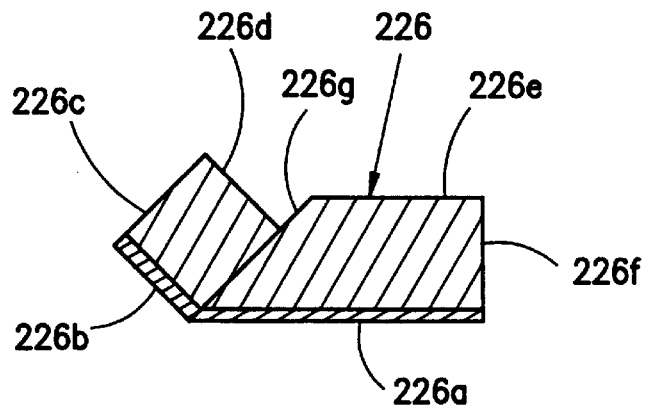
FIGS. 31a, 31b, and 31c display the processing of the workpiece, in cross-section, as it passes through the first stage bevel edge molding machine.
Figure 31B:
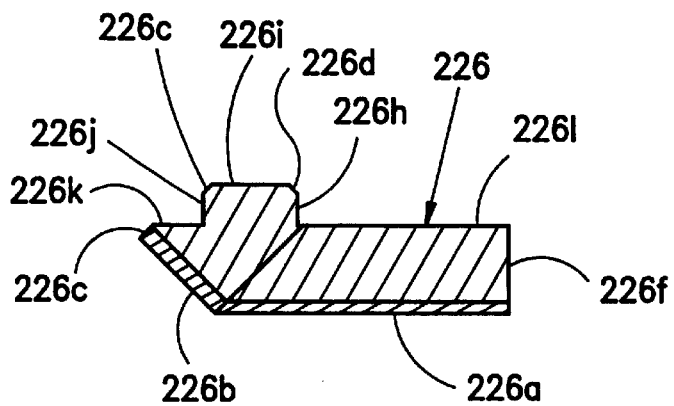
Figure 31C:
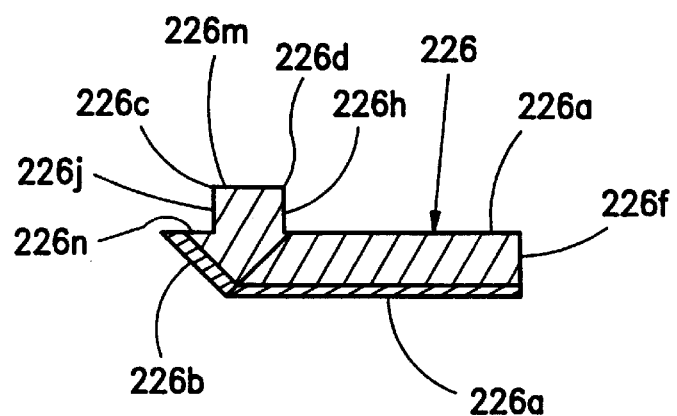

The operation of the machine 210 is discussed by referring to FIGS. 31a, 31b, and 31c. FIG. 31a displays a cross-section of the workpiece 226 as it enters the first stage bevel edge molding machine 210 before it is processed. Surfaces 226a and 226b are the laminated, decorative surfaces, these surfaces also contact the movable belt 214. Surfaces 226c, 226d, 226e and 226g are surfaces which are processed. Surfaces 226e and 226f contact track rollers 216, 217.

FIG. 31b displays a cross-section of the workpiece 226 after it has been cut by the hogging spindle 236. The cutting operation creates new surfaces 226h, 226i, 226j, 226k and 226l. The hogging cut removed a majority of the material that is required to be removed.

FIG. 31c displays a cross-section of the workpiece 226 after it has been cut by the finishing spindle 242. The cutting operation creates new surfaces 226m, 226n and 226o.

The above mentioned processing steps prepare the workpiece 226 for the final machining operation, as will be described below.

Figure 32:
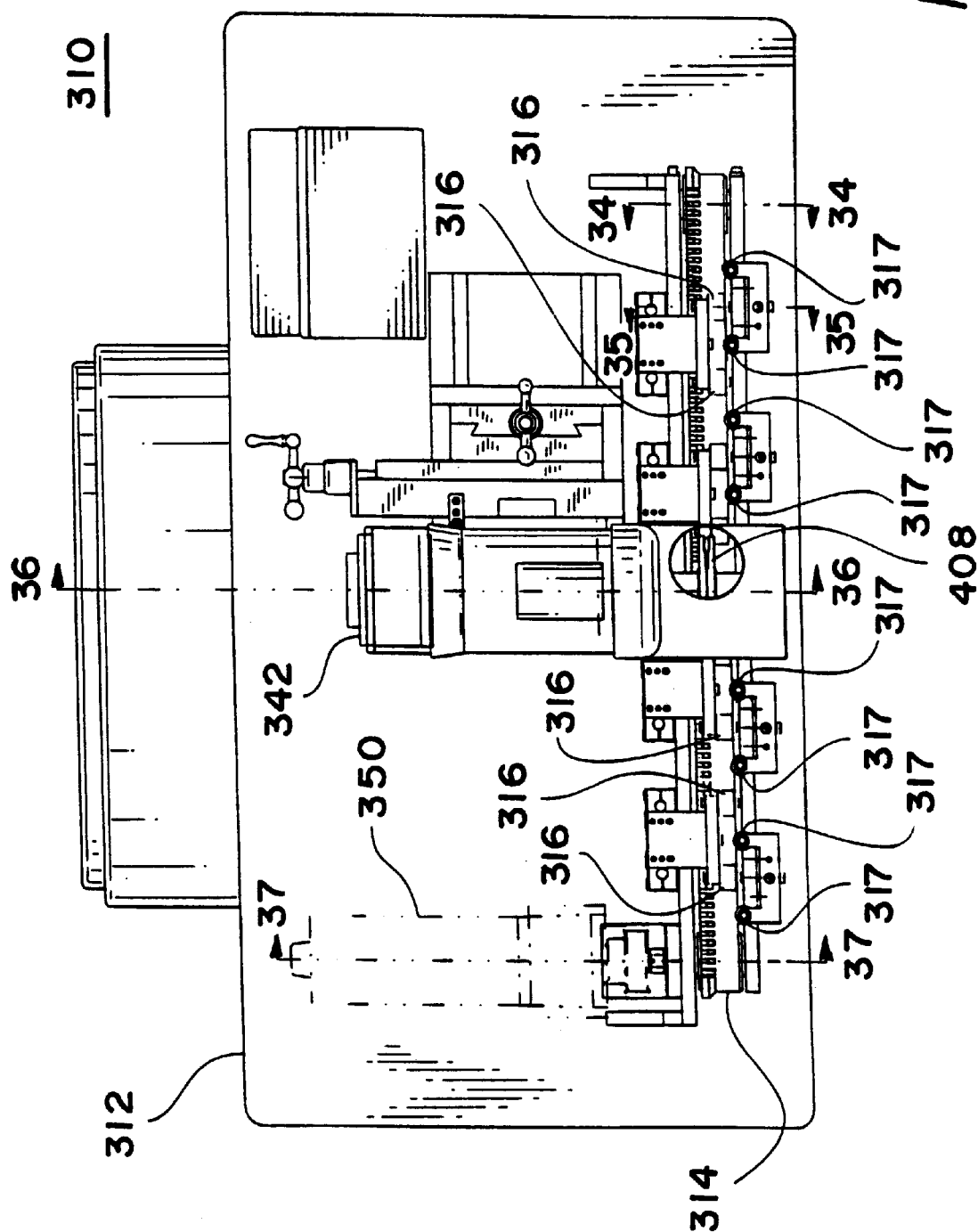
FIG. 32 is a plan view of the second stage bevel edge molding machine.

In another form of the invention, the high-accuracy processing machine takes the form of a second stage bevel edge molding machine 310. FIG. 32 is a plan view of the second stage bevel edge molding machine 310 which displays the general layout of the machine which includes a frame 312, a movable belt 314, the numerous track rollers 316, 317 positioned about a movable belt 314, a spindle 342, and a drive motor 350 shown in phantom line.

Figure 33:
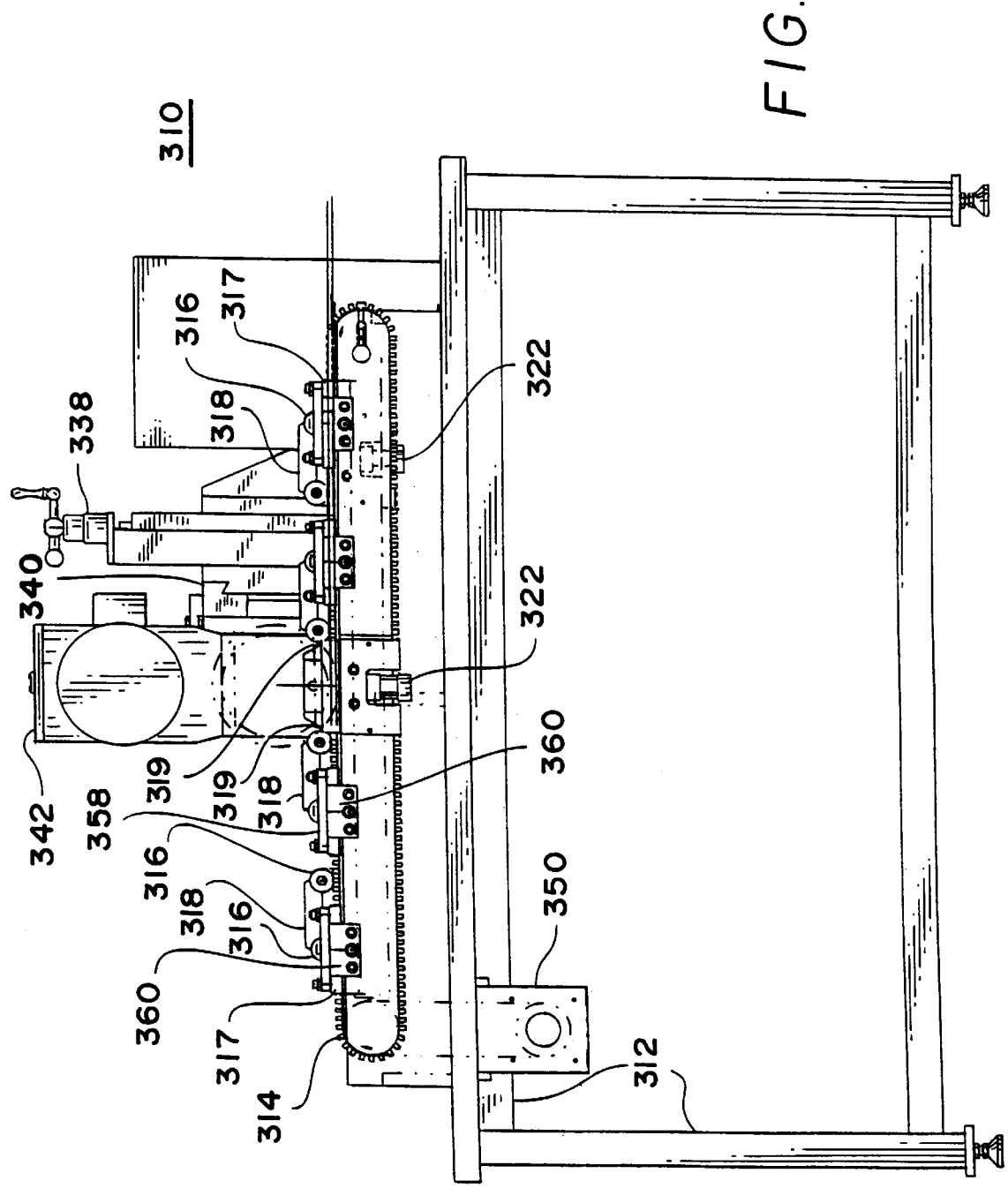
FIG. 33 is a front view of the second stage bevel edge molding machine.

FIG. 33 is a front view of the second stage bevel edge molding machine 310 showing the above mentioned parts along with other features such as track rollers 319, track roller slides 322 and spindle slides 338 and 340. Only one cutting operation is performed on the workpiece 226 by this machine 310, a single cut by the spindle 342.

Figure 34:
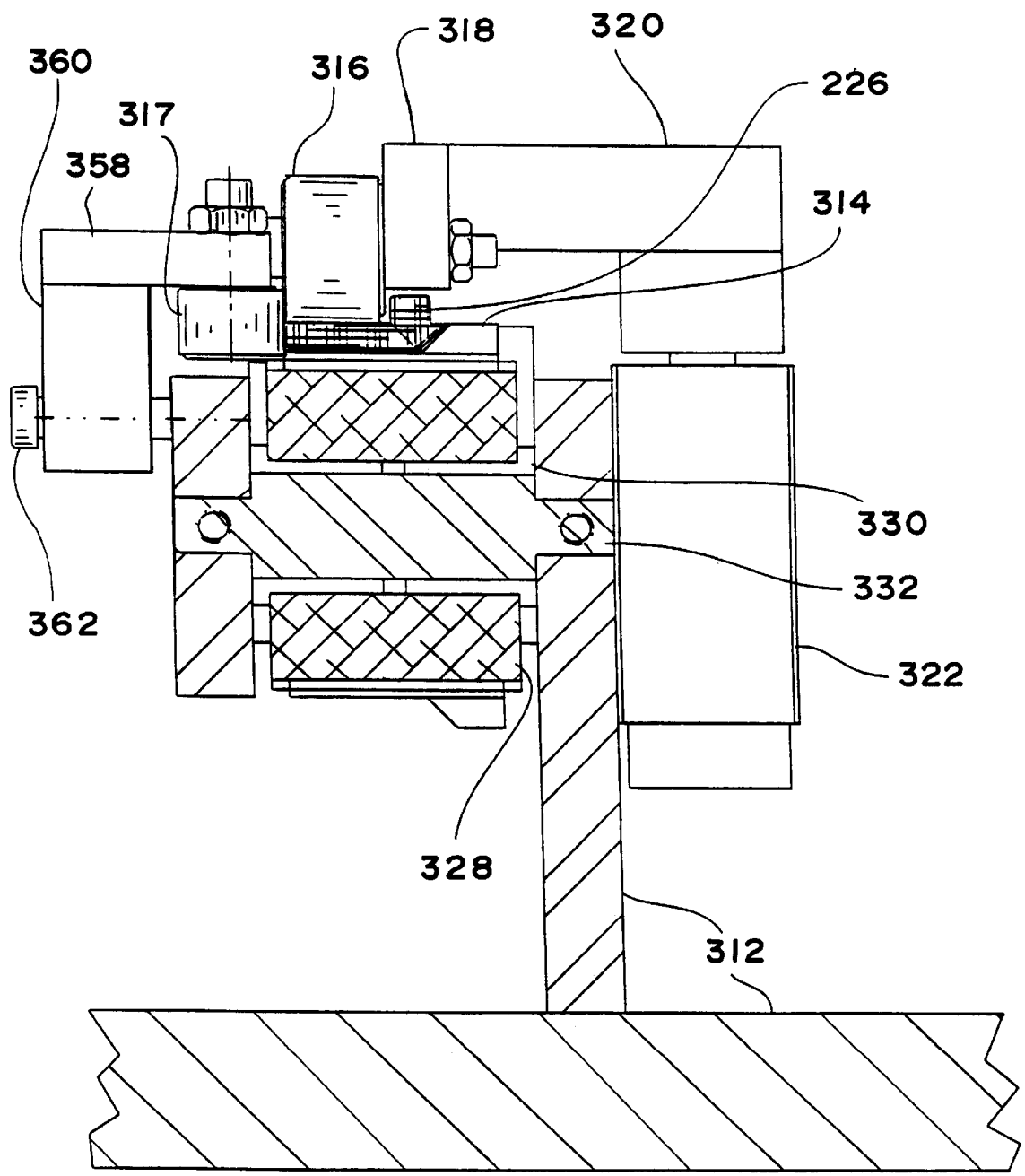
FIG. 34 is a partial cross-sectional view taken along line 34—34 of FIG. 32 in the vicinity of the inlet of the second stage bevel edge molding machine.

FIG. 34 is a partial cross-sectional view taken along section line 34—34 of FIG. 32 in the vicinity of the inlet to the machine 310. FIG. 34 displays the frame 312, the track roller slide 322, the leading idler shaft 332 mounted in the frame 312, the bearing 330 surrounding the leading idler shaft 332, the leading pulley 328 mounted on the bearing 330, the movable belt 314 rotatably connected to the leading pulley 328, and the workpiece 226 on the movable belt 314. FIG. 34 further shows the use of track rollers 316 to urge the workpiece 226 towards the movable belt 314. Track rollers 316 are connected to a yoke 318. The yoke 318 is connected to an arm 320. The arm is connected to the track roller slide 322. As in previous embodiments the track roller slide is a pneumatic actuator. Track rollers 316 are the same as track rollers 116 of the previous embodiment. Similarly, track rollers 317 are the same as track rollers 217 of the previous embodiment. Track rollers 319 are of the same size as track rollers 317, however track rollers 319 are mounted to a roller track slide 322. Additionally, track rollers 319 straddle the cutter 408 of the spindle 342.

FIG. 34 also shows the use of track rollers 317 to urge the workpiece 226 towards the movable belt 314. Track rollers 317 are connected to a lateral yoke 358 which is further connected to a lateral guide block 360. The lateral guide block 360 is attached to the frame 312 through use of a shoulder bolt 362.

Figure 35:
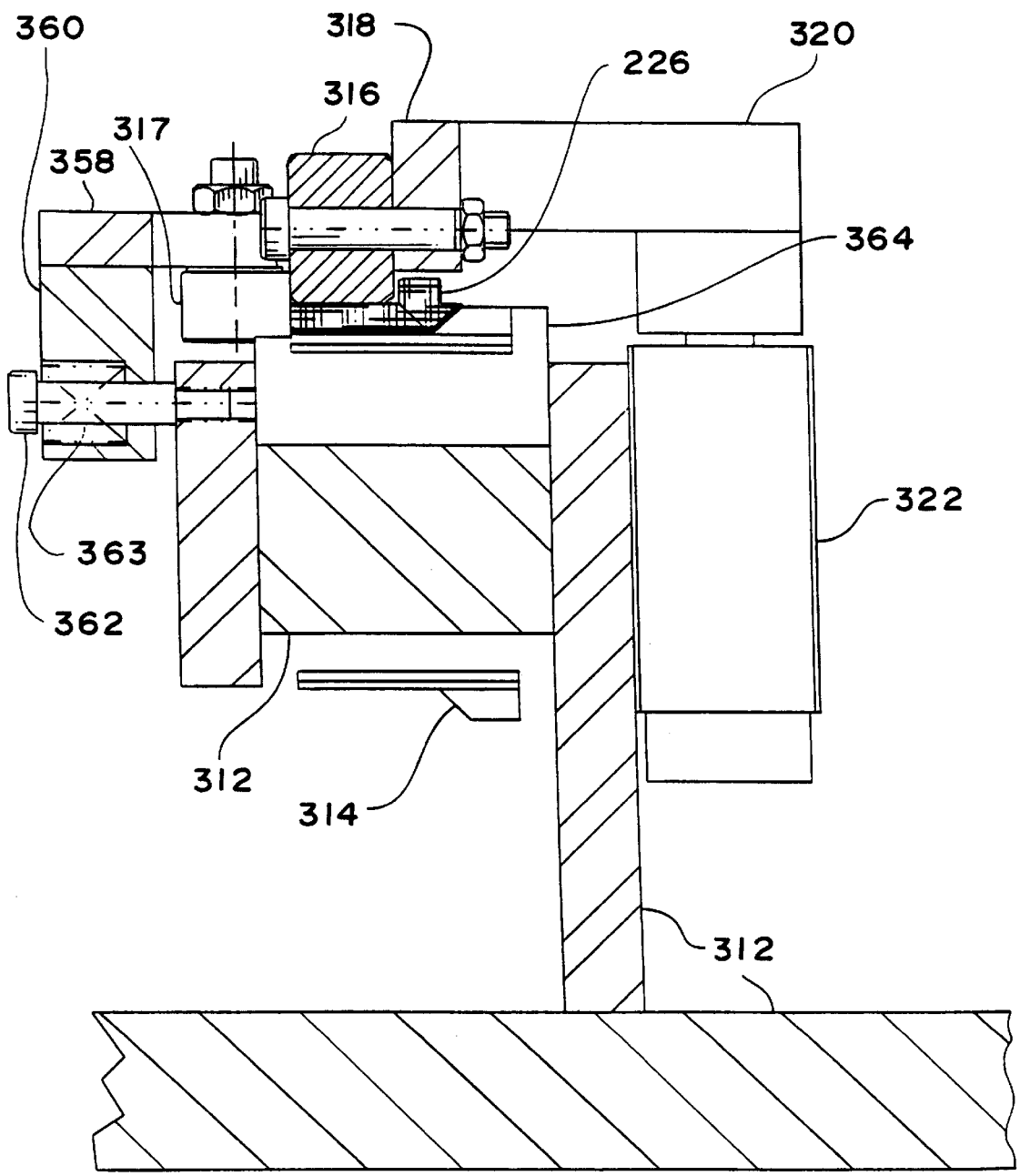
FIG. 35 is a partial cross-sectional view along line 35—35 of FIG. 32, showing the second stage bevel edge molding machine in the vicinity of the inlet of the machine.

FIG. 35 is a partial cross-sectional view along line 35—35 of FIG. 32 at location upstream of the spindle 342. FIG. 35 illustrates the use of the track rollers 316, 317, further illustrated is the element used to urge the track rollers 317 towards the workpiece 226. A lateral spring 363 is interposed between the lateral guide block 360 and the shoulder bolt 362 so as to enable the track roller 317 to urge the workpiece 226 against the movable belt 314. The lateral springs 363 are the same as the springs of previous embodiments. Also shown is the slider bed 364 mounted on the frame 312, and the movable belt 314 slidably mounted on the slider bed 364.

Figure 36:
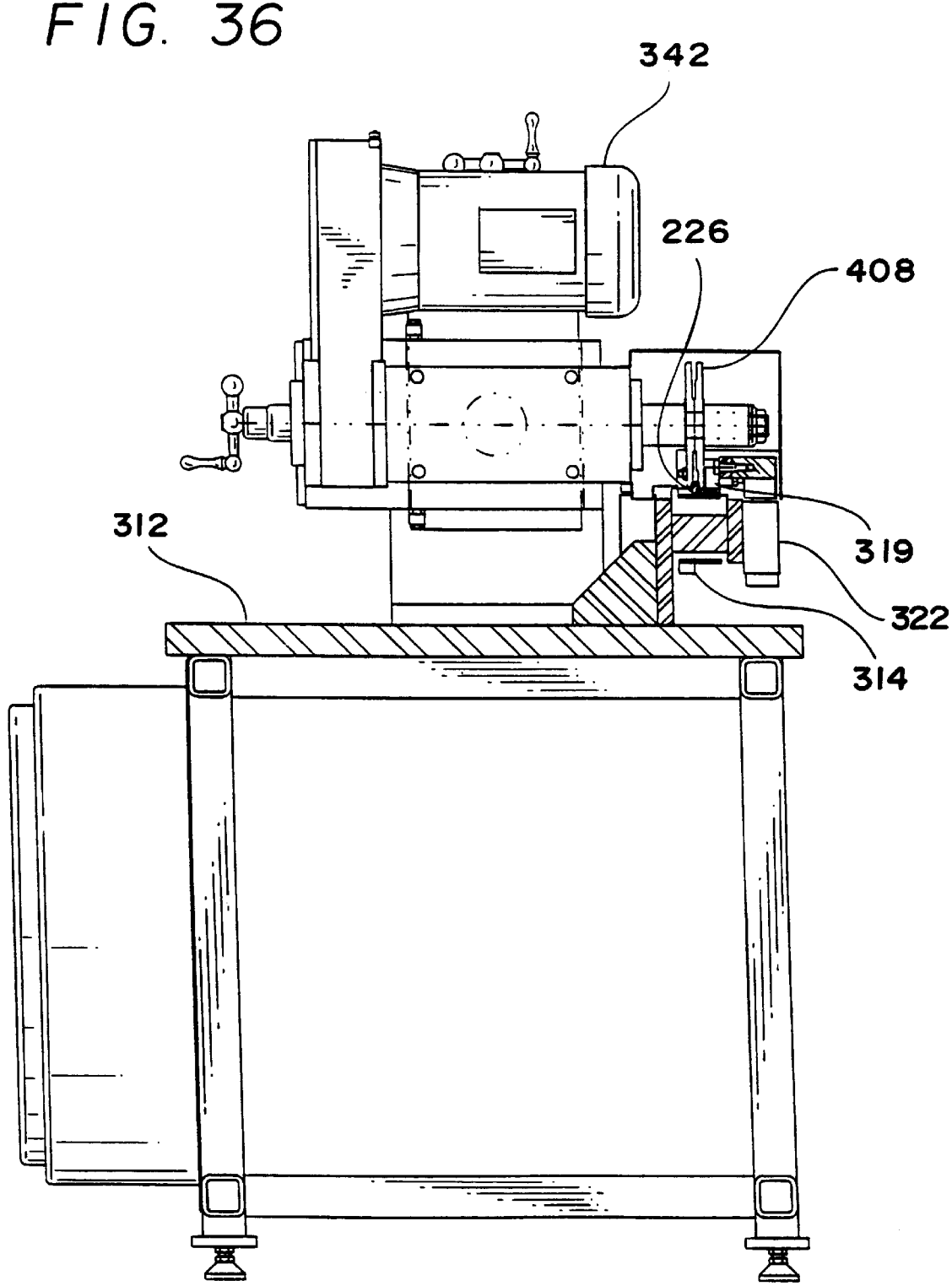
FIG. 36 is a partial cross-sectional view along line 36—36 of FIG. 32, showing the second stage bevel edge molding machine in the vicinity of the spindle.

FIG. 36 is a partial cross-section view along line 36—36 of FIG. 32 along the centerline of the cutter 408 of the spindle 342. As discussed in reference to FIG. 33, the track rollers 319 which are actuated pneumatically by one of the track roller slides 322 are positioned closely about cutter 408. The track rollers 319 are relatively small so that the workpiece 226 is securely held against the movable belt 314 while cutter 408 removes material from the workpiece 226. Thus, track rollers 319 keep the workpiece 226 stable during this critical cutting operation.

Figure 37:
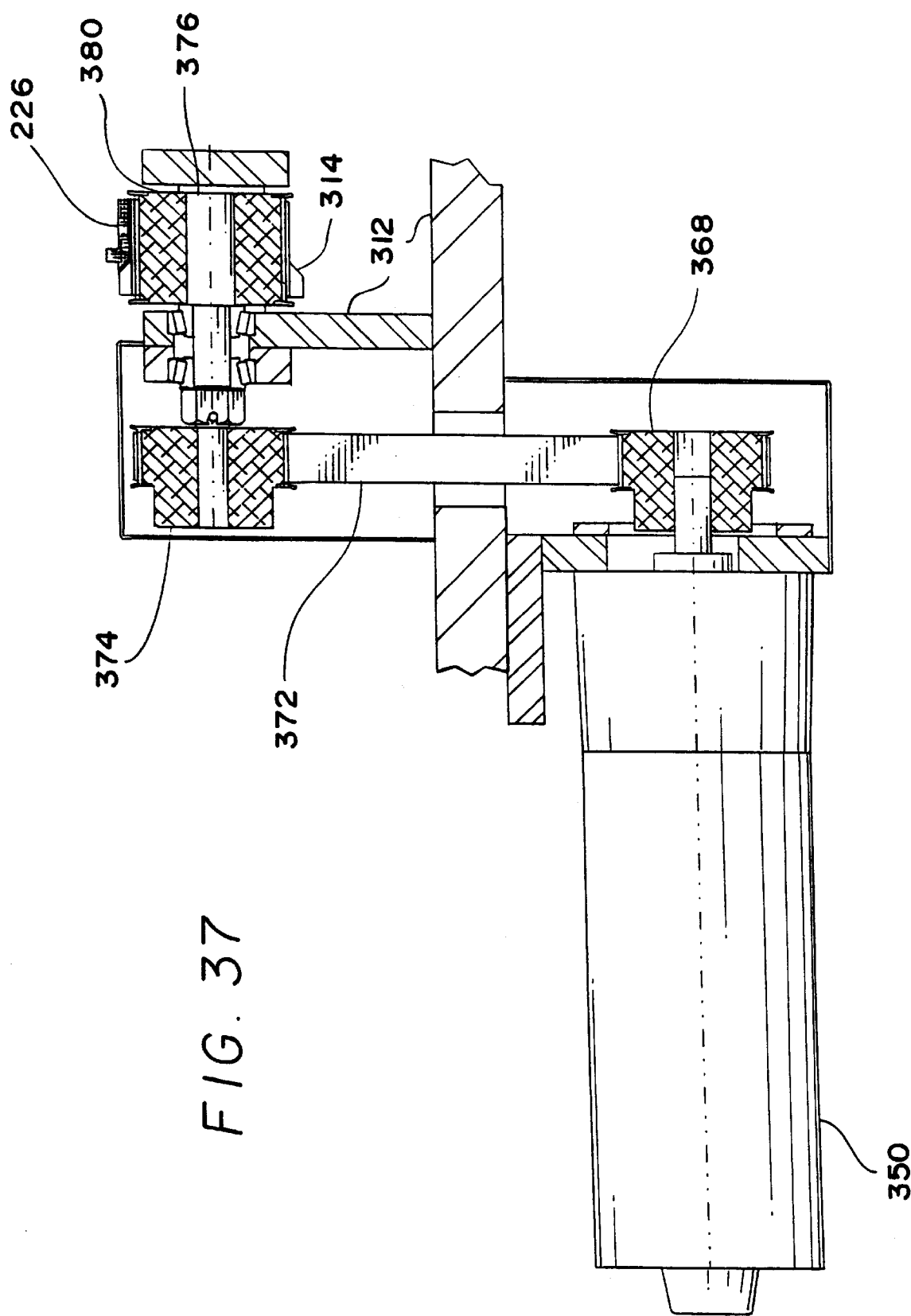
FIG. 37 is a partial cross-sectional view along line 37—37 of FIG. 32, showing the second stage bevel edge molding machine near the vicinity of the motor.

FIG. 37 is a partial cross-section view along line 37—37 of FIG. 32, showing the second stage bevel edge molding machine 310 in the vicinity of the drive motor 350. The assembly and operation of the motor 350 and associated pulleys 368, 374, 380, power transmission belt 372, idler shaft 376, frame 312, movable belt 314, workpiece 226, and bearings is similar to that of the previous embodiments 10, 110, and 210 and will not be discussed further. The linear feed rate of the workpiece 226 created by the motor 350 is similar to those of the previous embodiments.

Figure 38A:
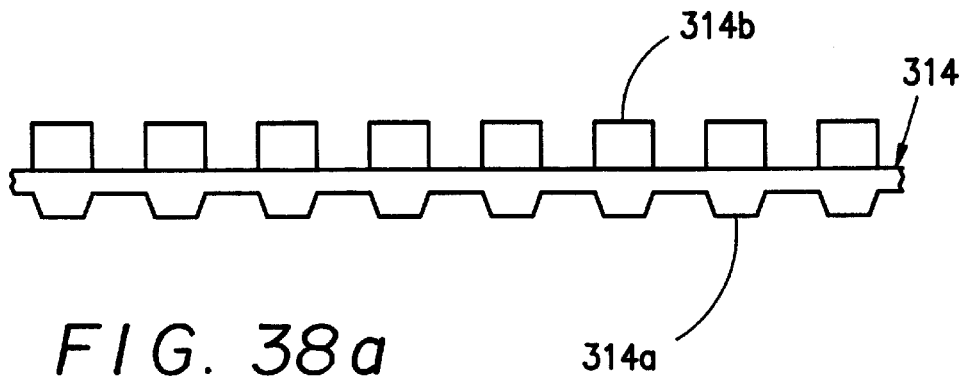
FIGS. 38a and 38b are side and cross-sectional views of the movable belt, respectively, of the second stage bevel edge molding machine.
Figure 38B:
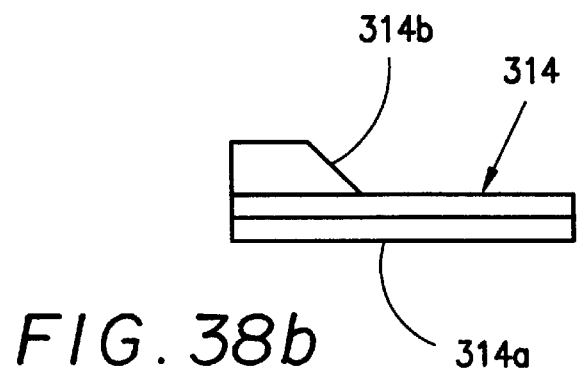

FIG. 38a is a partial side view of the movable belt 314 showing its cogs 314a on the lower surface so as to positively receive power from the drive motor pulley. Also shown is the segmented fence 314b which the workpiece contacts. The movable belt has a circumference of approximately ninety inches. FIG. 38b is a cross-section view of the movable belt 314. The cross-sectional shape of the movable belt 314 is the same as that of the movable belt 214 of the previous embodiment. The movable belt 314 is made by the same manufacturer and materials as are the movable belts 14, 114 and 214 of the previous embodiments.

Figure 39:
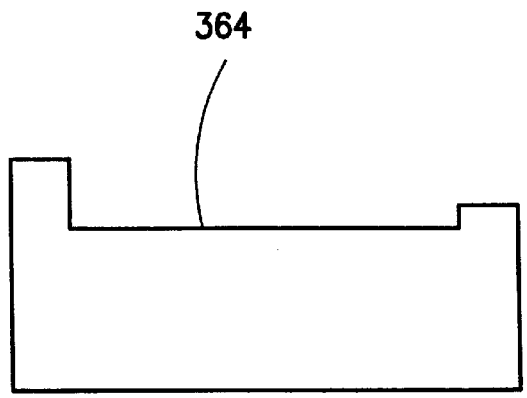
FIG. 39 is a cross-sectional view of the slider bed of the second stage bevel edge molding machine.

FIG. 39 is a cross-sectional view of the slider bed 364. The dimensions of the slider bed 364 are substantially the same as that of the slider bed 264 of the previous embodiment. The slider bed 364 is made by the same manufacturer and material as in the slider beds 64, 164 and 264 of the previous embodiments.

Figure 40:
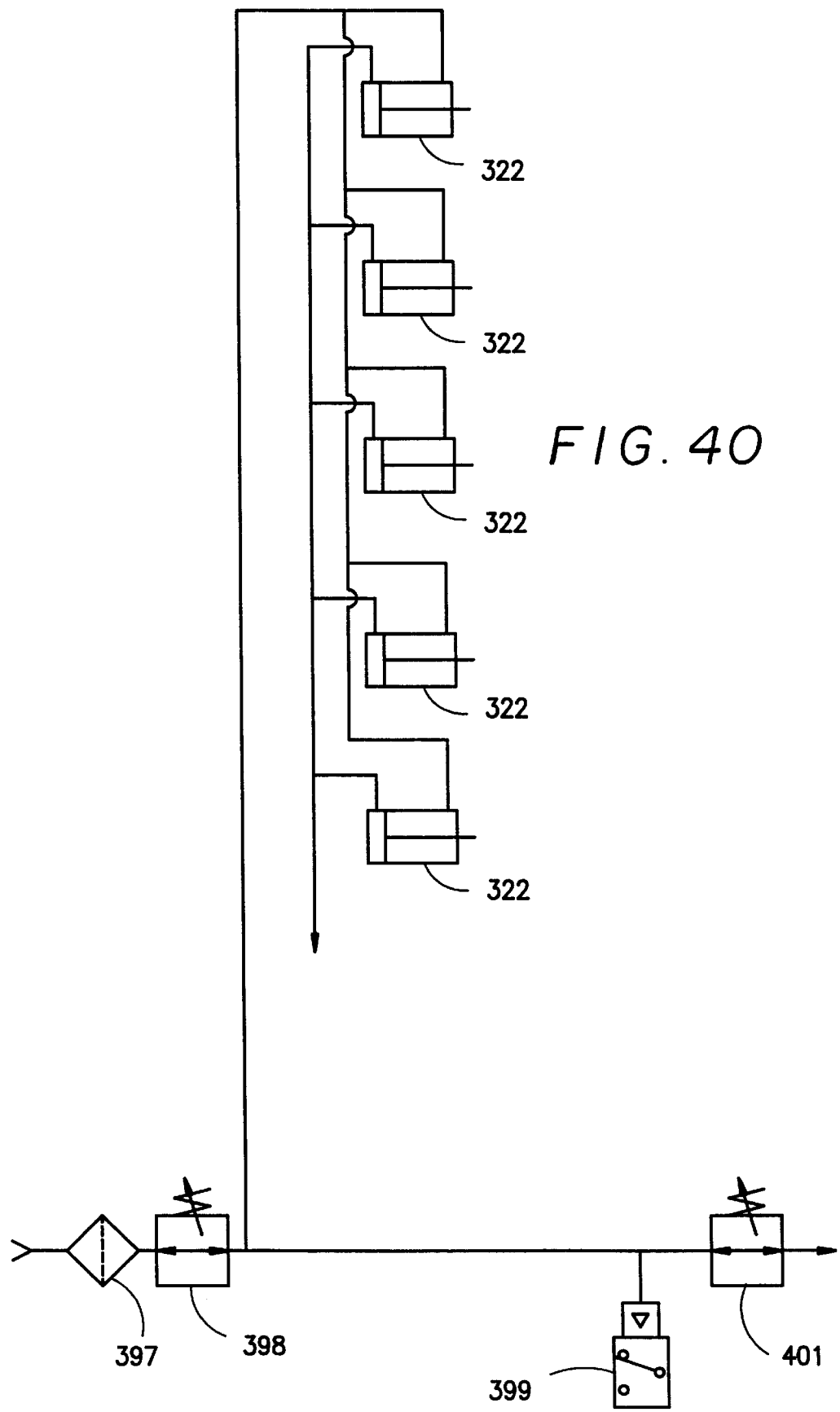
FIG. 40 is a schematic of the pneumatic system of the second stage bevel edge molding machine.

FIG. 40 is a schematic of the pneumatic system of the second stage bevel edge molding machine 310. The pneumatic system, operation, pressures, pneumatic actuators and flowrates are similar to those of previous embodiments 10, 110 and 210. The pneumatic actuators displayed therein are the track roller slides 322. FIG. 40 further illustrates the pneumatic actuators 322 used to urge the track rollers 316 and 319 against the workpiece 226. Air pressure is supplied from a compressor (not shown) which is attached to the filter regulator 397. The pneumatic system is activated by a pressure switch 399. The pneumatic schematic further shows that accessories can be attached to the pneumatic line adjacent to the regulator 401.

The form and operation of the second stage bevel edge molding machine 310 is similar to that of the first stage bevel molding machines 210 and to the other embodiments 10 and 110. Thus, only a short description of the operation of the second stage bevel edge molding machine 310 will be provided.

The spindle 342 is mounted to a pair of linear spindle slides which allows the spindle 342 to have adjustable positions, positions of which can be locked-in or maintained by the spindle slides. The spindle slides 338, 340 of the spindle 342 serve a similar purpose, operate in a similar manner, and are mounted to the frame and to the spindle in a manner similar to previous embodiments. Thus, the operation, mounting, and function of the spindle 342 will not be further discussed.

Figure 41:
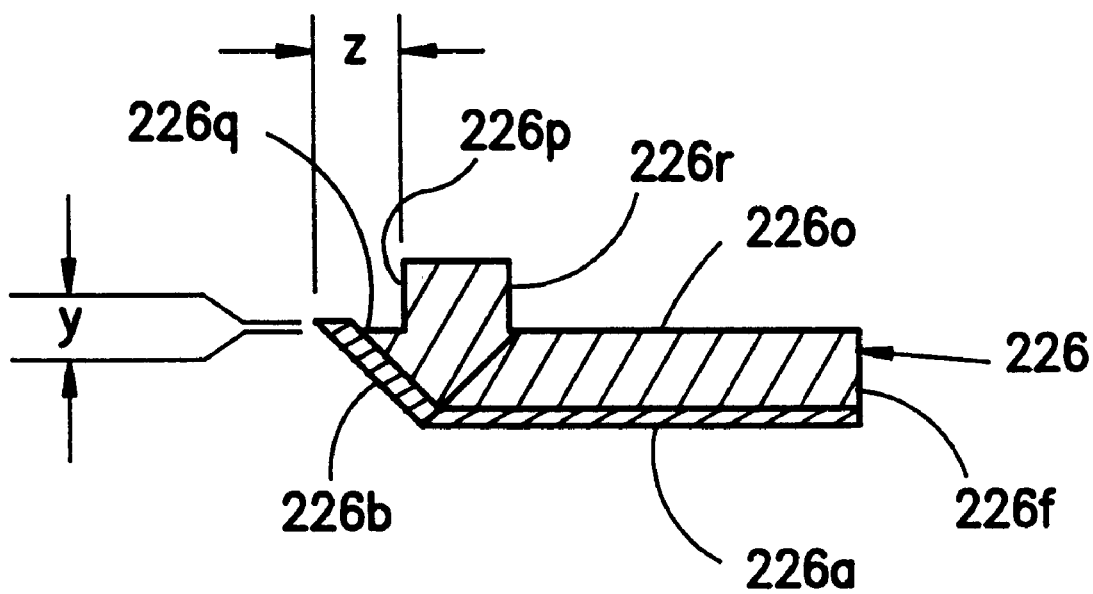
FIG. 41 is a cross-sectional view of the finished workpiece.

The operation of the machine 310 is discussed by referring to FIGS. 31c and 41. FIG. 31c displays a cross-section of the workpiece 226 as it enters the second stage bevel edge molding machine 310 before it is processed. Surfaces 226a and 226b are the laminated, decorative surfaces, these surfaces also contact the movable belt 314. Surfaces 226c, 226d, 226h, 226j and 226n are surfaces which are processed. Surfaces 226f and 226o contact track rollers 317, 318 and 319.

FIG. 41 displays a cross-section of the workpiece 226 after it has been cut by the spindle 342. The cutting operation creates new surfaces 226p, 226q and 226r. Surface 226q defines a glue trap. The glue trap top surface 226q is located approximately 0.01 inch below the edge of the decorative surface and is denoted by letter y in FIG. 41. Furthermore, the distance between the bevel tip and the front of the tongue, defined by the letter z, is held to tight tolerances during processing by this machine.

The use of the movable belt to transport the workpiece through the cutting machines of the preferred embodiment of the present invention provides the ability to generate high accuracy and high precision cuts along the molding, with little or no scratching or marring of the decorative laminate finish. Further, the high precision of the cuts provides for better fitting and better looking seams between sections of the high pressure decorative laminate surface. The use of the belt also allows the track rollers to be considerably smaller in diameter than the conventionally used drive rollers. This allows the track rollers to be placed closer to the processing means, preferably a cutting means, in order to provide superior holddown throughout the machine, preferably in the cutting zone. Further, the movable belts can be rapidly replaced, allowing both for quicker repairs and for quicker product line changes. For example, if a molding having a flat decorative finish is being run, the movable belt will preferably have a flat smooth surface on which the molding sits. Such a movable belt, however, would not be acceptable for processing a molding having a rounded or otherwise shaped profile. In such a case, the movable belt could be quickly exchanged for a different movable belt having an outer surface that has been modified by the addition of stabilizer tracks or other means, which would help hold the molding in place in a secure orientation on the belt. Thus product line changes would be significantly faster, due to the interchangability of the movable belts.

In addition, it is possible to have a plurality of movable belts in succession along the path traveled by the workpiece through the machine. Such a plurality of belts would be useful in the event that the profile of the workpiece changes during processing. Further, the track rollers used in the machine of the present invention can be of a variety of sizes (thickness or diameter) as described above, in order to accommodate for changes in size of the workpiece during processing.

Obviously, numerous modifications and variations of the present invention are possible in light of the above teachings. It is therefore to be understood that within the scope of the appended claims, the invention may be practiced otherwise than as specifically described herein.

We claim:

1. A machine for processing a workpiece which comprises:

a frame;

a slider bed mounted on said frame;

a movable continuous belt rotatably mounted around said slider bed, wherein the workpiece has a first surface that is in contact with an outer surface of said movable continuous belt during machine operation and wherein said outer surface of said movable continuous belt has sufficient friction, relative to said workpiece, to move the workpiece through the machine without slippage between the workpiece first surface and said outer surface, but does not mar or scratch the workpiece of the first surface;

a first portion of track rollers adjustably mounted on said frame to impart force onto the workpiece in a first direction;

at least one pneumatic element attached to the frame and to said first portion of track rollers, respectively, for urging said first portion of track rollers toward the workpiece at an urging force to maintain contact between and create a frictional force between the workpiece first surface and said outer surface of said movable continuous belt, wherein the at least one pneumatic element is controlled to provide a sufficient urging force to create a sufficient frictional force to prevent slippage between the workpiece first surface and said outer surface of said movable continuous belt;

a second portion of track rollers adjustably mounted on said frame to impart force onto the workpiece in a second direction; and at least one processing means mounted on said frame to perform a processing operation on a second surface of the workpiece during machine operation.

2. The machine for processing a workpiece according to claim 1, wherein said at least one processing means is a member selected from the group consisting of cutting means, sanding means, polishing means and marking means.

3. The machine for processing a workpiece according to claim 2, wherein said at least one processing means is a cutting means.

4. The machine for processing a workpiece according to claim 3, wherein said cutting means is supported by at least one spindle.

5. The machine for processing a workpiece according to claim 1, wherein said second portion of track rollers is resiliently biased.

6. The machine for processing a workpiece according to claim 1, further comprising a router mounted on said frame.

7. The machine for processing a workpiece according to claim 6, wherein said router is slidably mounted on said frame.

8. The machine for processing a workpiece according to claim 1, wherein said first portion of track rollers is oriented in a direction coparallel with said outer surface of said movable continuous belt and wherein said second portion of track rollers is oriented in a direction perpendicular to said outer surface of said movable continuous belt.

9. The machine for processing a workpiece according to to claim 8, further including a third portion of track rollers oriented at an oblique angle relative to said outer surface of said movable continuous belt.

10. The machine for processing a workpiece according to claim 1, wherein said movable continuous belt has a cogged inner surface.

11. The machine for processing a workpiece according to claim 1, wherein said at least one processing means is adjustably mounted to said frame.

12. The machine for processing a workpiece according to claim 1, further comprising a motor rotatably connected to said movable continuous belt.

13. The machine for processing a workpiece according to claim 12, wherein said motor is electric.

14. The machine for processing a workpiece according to claim 13, wherein said electric motor is a direct current electric motor.

15. The machine for processing a workpiece according to claim 1, further comprising at least two pulleys rotatably connected to said frame and to said movable continuous belt.

16. The machine for processing a workpiece according to claim 15, further comprising a motor rotatably connected to one of said at least two pulleys.

* * * * *